(12) United States Patent
Newman et al.

(10) Patent No.: US 7,975,002 B2
(45) Date of Patent: Jul. 5, 2011

(54) SYSTEM AND METHOD FOR ACCUMULATING A HISTORICAL CONTEXT OF INTERACTIONS BETWEEN COMPONENTS

(75) Inventors: Mark W. Newman, San Francisco, CA (US); W. Keith Edwards, San Francisco, CA (US); Jana Z. Sedivy, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 1077 days.

(21) Appl. No.: 11/784,112

(22) Filed: Apr. 4, 2007

(65) Prior Publication Data

US 2010/0011049 A1     Jan. 14, 2010

Related U.S. Application Data

(62) Division of application No. 10/317,580, filed on Dec. 12, 2002, now Pat. No. 7,624,143.

(51) Int. Cl.
G06F 7/00 (2006.01)
(52) U.S. Cl. ............. 709/203; 709/224; 709/228; 707/3
(58) Field of Classification Search ............. 709/203, 709/224, 228, 227, 220; 707/3; 713/200
See application file for complete search history.

(56) References Cited

U.S. PATENT DOCUMENTS

| | | | |
|---|---|---|---|
| 5,552,776 A | 9/1996 | Wade et al. | |
| 5,696,827 A | 12/1997 | Brands | |
| 5,928,157 A * | 7/1999 | O'Dwyer | 600/534 |
| 6,341,310 B1 | 1/2002 | Leshem et al. | |
| 6,601,041 B1 | 7/2003 | Brown et al. | |
| 6,601,233 B1 | 7/2003 | Underwood | |
| 6,633,878 B1 | 10/2003 | Underwood | |
| 6,883,019 B1 | 4/2005 | Sengupta et al. | |
| 6,917,938 B2 | 7/2005 | Shea et al. | |
| 7,072,886 B2 | 7/2006 | Salmenkaita et al. | |
| 7,089,428 B2 | 8/2006 | Farley et al. | |
| 7,100,195 B1 | 8/2006 | Underwood | |
| 7,103,806 B1 | 9/2006 | Horvitz | |
| 7,269,650 B2 | 9/2007 | Hamdan | |
| 7,296,042 B2 | 11/2007 | Edwards et al. | |
| 7,624,143 B2 * | 11/2009 | Newman et al. | 709/203 |

(Continued)

FOREIGN PATENT DOCUMENTS

JP     2002191039 A     7/2002

(Continued)

OTHER PUBLICATIONS

Sun Microsystems "A Collection of Jini™ Technology Helper Utilities and Services Specifications," Version 1.2, Dec. 2001.

(Continued)

*Primary Examiner* — Khanh Q Dinh
(74) *Attorney, Agent, or Firm* — Patrick J. S. Inouye; Krista A. Wittman

(57) ABSTRACT

A system and method for accumulating a historical context of interactions between components is presented. A plurality of components that each have a component context and which include at least one of a requester component and at least one of a service component are maintained. An interaction including the requester component requesting an operation to be performed by the service component is identified by sending the component context of the requester component to the service component. The component context of the requester component is recorded into the component context of the service component as contextual metadata.

23 Claims, 15 Drawing Sheets

U.S. PATENT DOCUMENTS

| | | | |
|---|---|---|---|
| 2002/0041648 A1 | 4/2002 | Sakata et al. | |
| 2002/0143759 A1 | 10/2002 | Yu | |
| 2002/0174236 A1 | 11/2002 | Mathur et al. | |
| 2003/0004937 A1* | 1/2003 | Salmenkaita et al. | 707/3 |
| 2003/0009385 A1* | 1/2003 | Tucciarone et al. | 705/26 |
| 2003/0135582 A1 | 7/2003 | Allen et al. | |
| 2003/0149887 A1* | 8/2003 | Yadav | 713/200 |
| 2003/0158855 A1 | 8/2003 | Farnham et al. | |
| 2003/0182394 A1 | 9/2003 | Ryngler et al. | |
| 2007/0156670 A1 | 7/2007 | Lim | |
| 2007/0156696 A1 | 7/2007 | Lim | |
| 2007/0180490 A1 | 8/2007 | Renzi et al. | |

FOREIGN PATENT DOCUMENTS

| | | | |
|---|---|---|---|
| JP | 2002269040 A | 9/2002 | |
| JP | 2002334162 A | 11/2002 | |

OTHER PUBLICATIONS

Sun Microsystems "Jini™ Technology Core Platform Specifications," Version 1.2, Dec. 2001.

UDDI.ORG Universal Description, Discovery and Integration "UDDI Data Structure Reference V1.0," UDDI Published Specification, Jun. 28, 2002.

UDDI.ORG Universal Description, Discovery and Integration "UDDI Programmer's API 1.0," UDDI Published Specification, Jun. 28, 2002.

UDDI.ORG. Universal Description, Discovery and Integration "UDDI Technical White Paper," Sep. 6, 2000.

* cited by examiner

SYSTEM AND METHOD FOR ACCUMULATING A HISTORICAL CONTEXT OF INTERACTIONS BETWEEN COMPONENTS

CROSS-REFERENCE TO RELATED APPLICATIONS

This patent application is a divisional of U.S. patent application, Ser. No. 10/317,580, filed Dec. 12, 2002 now U.S. Pat. No. 7,624,143, issued Nov. 24, 2009, which is related to U.S. patent application, Ser. No. 10/317,342, filed Dec. 12, 2002 U.S. Pat. No. 7,461,172, issued Dec. 2, 2008 and U.S. Pat. No. 6,810,363, issued Oct. 26, 2004, the disclosures of which are incorporated by reference, and the priority filing dates of which are claimed.

FIELD

This invention relates generally to systems and methods that use and share metadata.

BACKGROUND

In data communication environments, such as a distributed network, many different vendors provide a number of products for specific services. Heretofore, a predetermined set of domain-specific protocols has been required to be specified to enable arbitrary components in the environment to communicate with each other, assuming the components were transmitting or receiving data, hereinafter referred to as "transferring data." For example, a device manufactured by one vendor would have difficulty communicating with a device manufactured by another vendor without using the predetermined set of protocols mentioned above. The problem of different vendors requiring different predetermined protocols has been partially dealt with by adopting existing protocol standards. However, there are different standards organizations and thus different protocol standards.

When arbitrary components such as computer applications or programs, data, memory, file directories, individual files, printer devices, cellular telephones, facsimile machines, copier machines, scanner devices, desk-top computers, laptop computers, personal digital assistant ("PDA") systems, or any other device, for example, attempt to communicate without having a priori knowledge of each other, particular domain-specific protocols, such as the file system domain (e.g., NFS and CIFS) or the printer domain (e.g., IPP and LPR), must be known a priori by both parties to successfully communicate. An arbitrary component, such as a PDA attempting to communicate with a file system, or a printer device attempting to do the same, must be explicitly programmed to understand one or more of the standardized protocols mentioned above. An example includes a computer device or application having to be programmed to understand a printer device by installing a domain-specific printer driver. If the device or application is programmed to understand how to communicate and use a printer device, generically, the driver will only enable the device or application to access a particular type of printer device and not the universe of all printer devices. Thus, when new and unknown components enter the equation, the application must be reprogrammed to understand the new standardized protocols used to communicate with the new components. Referring to the above computer and printer device example, if a new type of printer were introduced, the computer device would have to be re-programmed to be able to transfer data with the new printer device by installing a printer driver specific to the new printer device. Thus, each application must be explicitly written to use a particular set of standardized protocols prior to communicating with the components associated with the protocols.

In a system such as Jini™, developed by Sun Microsystems of Palo Alto, Calif. and described in "A collection of Jini™ Technology Helper Utilities and Services Specifications," Palo Alto, Calif., Sun Microsystems, Inc., pp. 1-214, 2000; and "Jini™ Technology Core Platform Specification," Palo Alto, Calif., Sun Microsystems, Inc., pp. 1-126, 2000, which uses domain-specific interfaces, in order for a component such as a PDA system to communicate with another component such as a printer, the PDA system must contain a priori knowledge of the semantics of the printer's programmatic interfaces. In other words, a component that knows how to print still might not know how to transfer data between a file system, a scanner device or a network translation service until it is explicitly programmed to know how to communicate with the interface for the particular components.

Currently, ubiquitous computing environments do not allow for the network effect. That is, as additional components are added to the environment, they do not have the capability to do more than add the capability of that new component to the environment. It would be advantageous to provide some mechanism where the addition of components in an environment enhances the operation of the components in the environment.

Additionally, some systems maintain contextual information in an ad hoc manner with respect to the components within the system. Such contextual information is often represented in various formats depending on the type of component it represents, such as whether the component is a user, a document or application. This often makes it difficult or impossible for arbitrary components within a system to provide each other with current contextual information, particularly if the arbitrary components do not have a priori knowledge of each other.

One problem with contextual systems is that of establishing credibility (for example, verifying that a property value has not been inappropriately changed). Another problem is that it is very difficult to understand system behavior in a ubiquitous computing environment because the environment is so fluid. It would be advantageous to be able to verify how a property value changed and why the system behaved in a particular way.

One problem using discovery mechanisms in ubiquitous computing environments is that these mechanisms often return very long lists of the discovered components without providing information to assist a user in understanding and selecting the useful components for the current situation. It would be advantageous to preferentially provide the user with information that is relevant to the current situation.

SUMMARY

Disclosed herein are embodiments for a method and system of accumulating a historical context of interactions between components in an environment where each of the components has a component context that can be revealed. The components include a requester component and a service component. The requester component requests an operation to be performed by the service component. The requester component passes its context to the service component with the operational request. The requester component context is recorded as service component contextual metadata and becomes part of the historical context.

Other embodiments are disclosed for methods, apparatus and program products used to accumulate a historical context of changes in a component context that can be revealed. The apparatus and program products detect an operation that will change a portion of the component context and accretes that portion with the historical context. Then the apparatus and program products change the portion responsive to the operation.

Yet other embodiments are disclosed for methods, apparatus and program products where a component receives a request and applies a contextual access policy to the request. After applying the contextual access policy to the request, the component checks that the request satisfies one of a set of contextual access permissions and, if so, satisfies the request.

A further embodiment provides a system and method for accumulating a historical context of interactions between components. A plurality of components that each have a component context and which include at least one of a requester component and at least one of a service component are maintained. An interaction including the requester component requesting an operation to be performed by the service component is identified by sending the component context of the requester component to the service component. The component context of the requester component is recorded into the component context of the service component as contextual metadata.

Other objects, features and advantages will be apparent from the accompanying drawings and from the following detailed description.

DETAILED DESCRIPTION

Figure 1:
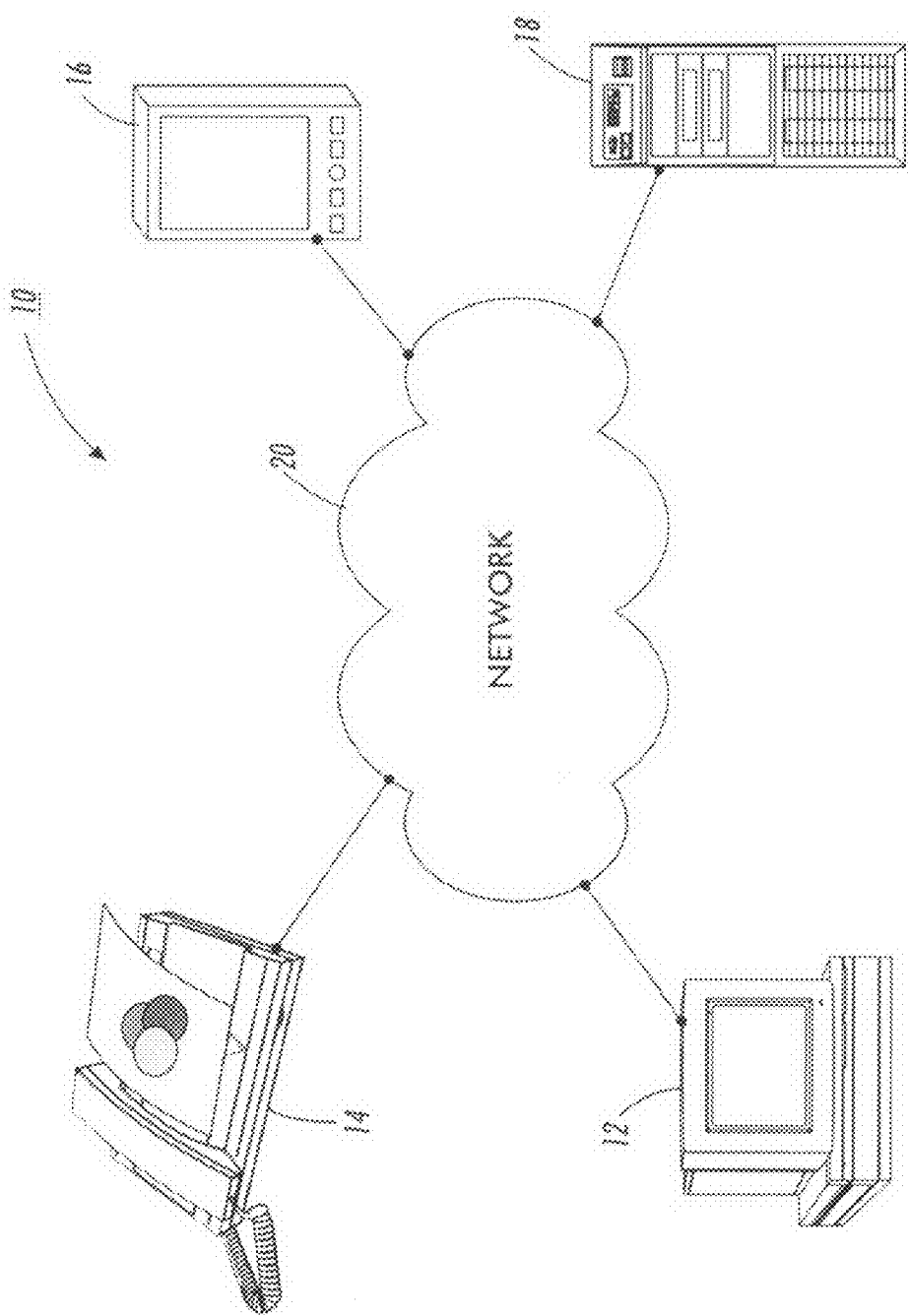
FIG. 1 is a perspective view of a system for providing context information in accordance with embodiments.

A system 10 for providing context information in accordance with embodiments are shown in FIG. 1. System 10 includes computer 12, printer 14 (including multi-function devices), personal digital assistant ("PDA") 16 and server 18 ("components 12-18"), which are coupled together by network 20, although system 10 could comprise other types and numbers of systems and devices. A method includes invoking a universal contextual interface associated with a first component and executing instructions associated with the universal contextual interface to transfer the contextual data between components 12-18. One embodiment allows components using the same or different communication protocols and/or data types to transfer context information between each other without requiring the components to use domain-specific interfaces, protocols or data formats. Moreover, the embodiment provides for enabling users, devices or applications to retrieve and provide each other with current context information and other data directly to each other without requiring the components to have prior knowledge of each other.

Referring more specifically to FIG. 1, computer 12, printer 14, PDA 16 and server 18 are coupled to and may communicate with each other by way of network 20, although the components 12-18 may be coupled directly to each other (e.g., a peer-to-peer system). In embodiments, network 20 comprises a wide area network ("WAN") such as the Internet, although it may comprise a local area network ("LAN") such as an Ethernet® network developed by the assignees of the present application, or a Novell®, 3Com® or IBM PC® LAN network. Where network 20 comprises a WAN, cellular or satellite communications network systems that utilize signals such as satellite signals, radio waves, microwaves and/or infrared signals may be used. Where network 20 comprises a LAN, it may be organized in a bus network configuration, although a number of other network configurations may be utilized such as a token ring, star, tree or mesh configuration depending on the needs, resources and types of components 12-18 in network 20. Further, network 20 may comprise one or more WAN's or LAN's including networks utilizing wireless, wired, and fiber connections. Such networks generally transfer data through the use of an electromagnetic carrier wave whether transmitted via optical means, wire means, wireless means, or other computer signaling means. Data can also be transferred to a computer using computer readable media such as floppy disks, CD/DVD disks or memory cards such as flash memory, memory sticks etc.

Figure 2:
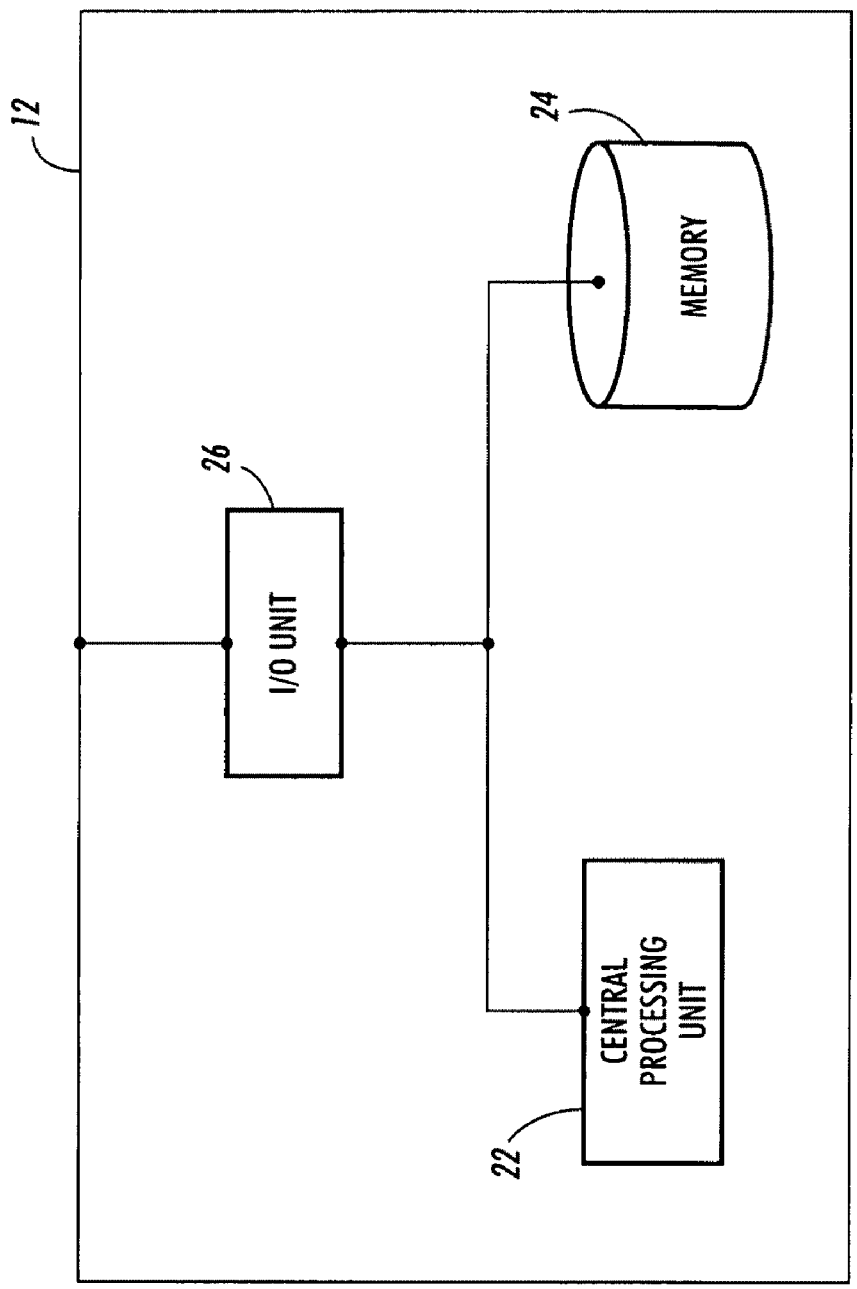
FIG. 2 is a block diagram of an exemplary arbitrary component utilized in the system for providing context information.

Referring to FIG. 2, in embodiments computer 12 comprises a central processing unit ("CPU") 22, memory 24 and I/O unit 26, which are coupled together by one or more buses. By way of example only, computer 12 may also comprise a scanner, cellular telephone, display device, video input/output device, audio input/output device, remote control device or an appliance, although computer 12 may comprise any type of device or system that can store, process and execute instructions including devices with circuitry that are hard-wired to execute instructions for performing one or more methods as described and illustrated herein.

Computer 12 executes instructions for an operating system environment it is operating in, such as the UNIX® environment, as described in "Advanced Programming in the UNIX® Environment," W. Richard Stevens, Addison-Wesley Publishing Company, 1974. In embodiments, computer 12 does not use the same communication protocol as any of the other components 14-18, although it may use the same communication protocol as any of the other components 14-18. By way of example only, computer 12 may be operating in the UNIX® environment using a first type of communication protocol to transfer data, while printer 14 may be operating in a Microsoft Windows® environment but using a second type of communication protocol. Additionally, computer 12 may use one or more communications protocols to communicate with one or more components 14-18 on network 20, including xDSL, ISDN, TCP/IP or protocols defined by the RFC process and/or OSI organizations.

CPU 22 may comprise an Intel Pentium III processor, although CPU 22 may comprise a number of other processors such as a picojava I or PowerPC G4 processor. The CPU 22 executes at least one program of stored instructions for a method of providing context information in accordance with embodiments. CPU 22 may also execute instructions for other tasks, including network services such as providing data, memory, file directories, individual files, word processing applications, accounting applications or engineering applications. As a result, when one of these applications is executed, the instructions for the task, such as for creating a spreadsheet, as well as the instructions for performing one or more methods are carried out by the CPU 22 in computer 12. The instructions may be expressed as executable programs written in a number of computer programming languages, such as BASIC, Pascal, C, C++, C#, Java, Perl, COBOL, FORTRAN, assembly language, machine code language, or any computer code or language that can be understood and performed by the CPU 22.

Memory 24 may comprise any type of fixed or portable memory device accessible by the CPU 22, such as hard-disks, floppy-disks, compact disks, digital video disks, magnetic tape, optical disk, ferroelectric memory, ferromagnetic memory, read only memory, random access memory, electrically erasable programmable read only memory, erasable programmable read only memory, flash memory, static random access memory, dynamic random access memory, charge coupled devices, smart cards, or any other type of computer-readable mediums. Memory 24 stores instructions and data for performing the embodiment for execution by CPU 22, although some or all of these instructions and data may be stored elsewhere. Although the CPU 22 and memory 24 are shown in the same physical location, they may be located at different physical locations, such as in server 18.

I/O unit 26 couples computer 12 to network 20 to allow computer 12 to communicate with network 20, and hence components 14-18. In embodiments, I/O unit 26 may comprise a router such as any type of Ethernet based device, although I/O unit 26 may comprise a modem device using a dial-up communication system through private branch exchanges ("PBX") and public switched telephone lines.

Referring back to FIG. 1, printer 14 is coupled to network 20 in the same manner described above with respect to computer 12 and network 20. In embodiments, printer 14 comprises a printing device capable of rendering graphical representations on a printing medium, for example.

PDA 16 is coupled is to network 20 in the same manner described above with respect to computer 12 and network 20, including a wireless communication connection. In embodiments, PDA 16 comprises a hand held computing device that may perform such functions as telephony, facsimile transmissions or networking.

Server 18 is coupled to network 20 in the same manner described above with respect to computer 12 and network 20. Server 18 comprises a computer system having one or more CPU's, memory and I/O units, which are coupled together by one or more buses and used by server 18 to store and process instructions in accordance with embodiments as described further herein.

While components such as computer 12, printer 14, PDA 16 and server 18 have been used as examples in embodiments, by way of example only, a number of other systems may be used as components 12-18 such as software services, files, applications or portions thereof including language translation services, data format converters, e-mail applications, calendar applications, or a spell checking routine executing within a word processing application.

Figure 3:
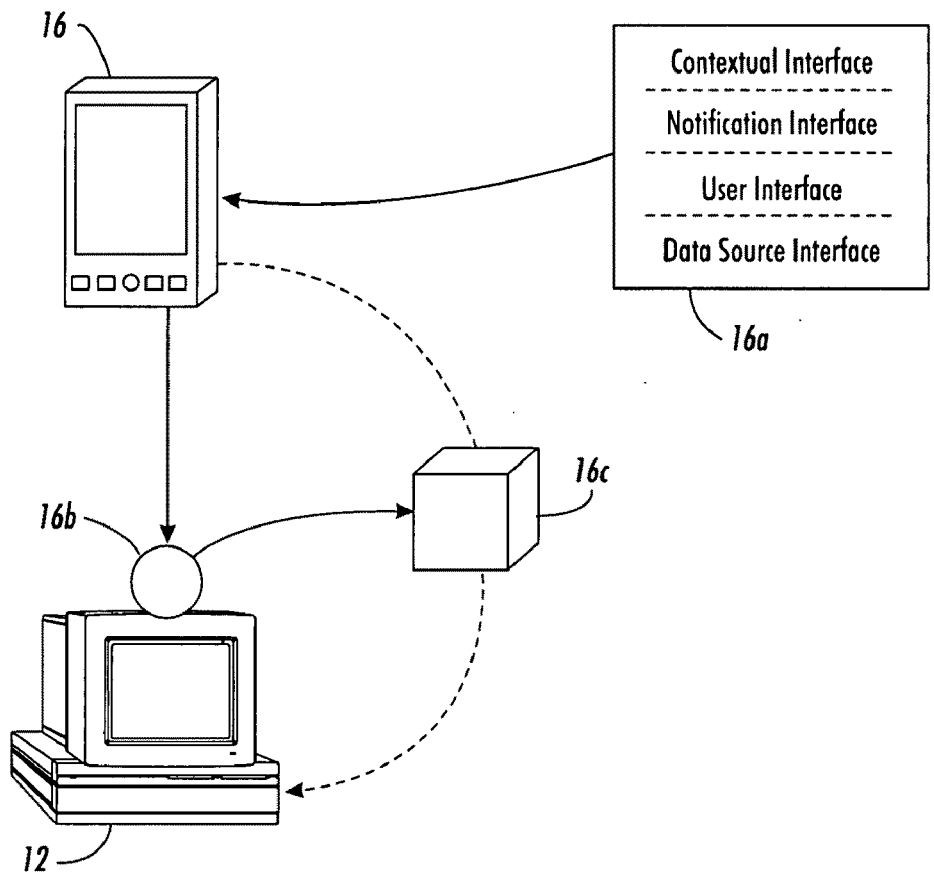
FIG. 3 is a partial perspective view of a system for providing context information in accordance with embodiments.

Referring to FIG. 3, computer 12 is coupled to PDA 16 as described above in connection with FIG. 1. PDA 16 has stored in a memory or otherwise has access to, which will hereinafter be referred to as being "associated with," a set of universal interfaces 16a comprising a contextual interface, a notification interface, a user interface and a data source interface. The particular number and/or combination of interfaces may vary and will depend upon the particular type of device PDA 16 is, and the capabilities and/or services desired or provided by it. Also, PDA 16, and hence the set of universal interfaces 16a, may be updated at any time to add, delete or modify interfaces.

Each of the interfaces in the set of universal interfaces 16a comprise instructions, sets of operations and/or other data that are particular to PDA 16 yet can be understood and performed by computer 12 to enable it to communicate and transfer (i.e., transmitting or receiving) contextual data with PDA 16, provide event notifications to computer 12 with respect to changes in contextual data for PDA 16, enable computer 12 to receive user interfaces to allow users of computer 12 to view changed contextual data or enable computer 12 to receive data from PDA 16. Moreover, while each of the interfaces will be described below, a detailed description of these and other interfaces is included in commonly-owned U.S. Pat. No. 7,296,042, issued Nov. 13, 2007, which is hereby incorporated by reference in its entirety.

In particular, the contextual interface comprises a getContext( ) operation that may include instructions, operations and data that may be performed by computer 12 to request and access a context object 16c, which will be described in further detail herein. Contextual data may include information with respect to PDA 16 such as its type (i.e., make and model), owner, history of use, whether PDA 16 is currently in use or other operating status information, identity, location on network 20, physical location, administrative domain, information with respect to one or more users of PDA 16 or files stored at PDA 16, or any other type of environment information that PDA 16 may provide, for example. Further, contextual data may also include computer language instructions particular to PDA 16 that may be understood and executed by computer 12. In embodiments, the contextual data may be stored in a memory at PDA 16 in any format depending upon the particular type of device or application PDA 16 is, such as a multi-valued data structure that resembles a hash table or a data structure comprising an array of records, for example.

In embodiments, a context object 16c associated with PDA 16 may be obtained by computer 12 through the getContext( ) operation. The context object 16c may comprise a live, remote reference to an object that supports one or more operations returned by the getContext( ) operation including a getProperty( ) and a setproperty( ) operation as well as any other instructions that enable computer 12 to access current and/or historical contextual data associated with PDA 16, although the object 16c may directly include the contextual data. In particular, the instructions may communicate with PDA 16 using a first protocol such as an IR protocol, the type of protocol depending upon the type required by the manufacturer of PDA 16. The getProperty( ) operation may include instructions for requesting that contextual data be returned to computer 12 from PDA 16 so computer 12 may read the contextual data associated with PDA 16. The setProperty( ) operation includes instructions and data that may be performed by computer 12 to provide PDA 16 with contextual data so computer 12 may update or modify the contextual data of PDA 16.

The notification interface (such as provided by the proxy object) comprises a register( ) operation that may include instructions, operations and data that may be performed by computer 12 to enable it to register itself as a listener with respect to PDA 16 for receiving asynchronous notifications about changes to the contextual data of PDA 16, although it may receive synchronous notifications as well. The notification interface may be passed one or more parameters when invoked, including a component parameter and a context parameter. The component parameter identifies computer 12 as the recipient of the notifications, although printer 14 and server 18 may also be identified. The context parameter comprises current and/or historical contextual data about the computer 12 that represents one or more properties that may be relevant to PDA 16 for deciding whether it should provide notifications to computer 12. Alternatively, the context parameter may comprise a context object providing PDA 16 with a live, remote reference to the contextual data associated with computer 12. The context object of computer 12 would be the same as the context object 16*c* of PDA 16, except it would be associated with computer 12. In embodiments, PDA 16 is programmed to send notifications to registered listeners (i.e., computer 12) when its contextual data changes, although PDA 16 may send the notifications at predetermined time increments, or the computer 12 can poll the PDA 16 for changed information.

The user interface comprises a getUI( ) operation that may include instructions, operations and data that may be performed by computer 12 for generating a user window. In particular, the getUI( ) operation returns to computer 12, from PDA 16, an object having instructions that may be executed by computer 12 to generate and display a user interface window to enable users at computer 12 to access the functionality of (including accessing the contextual data associated with) PDA 16. In embodiments, computer 12 passes its context parameter to the getUI( ) operation when invoking it for a variety of reasons, such as for security purposes to identify a user at computer 12 to PDA 16 or for identifying the location of computer 12 (such as the physical location of the computer 12 and/or the location on the network 20). PDA 16 may decide whether to provide computer 12 with its user interface based upon the contextual data provided by way of the context parameter. Moreover, computer 12 may be programmed to generate a user window to display the contextual data associated with PDA 16 upon receiving event notifications with respect to changed contextual data associated with PDA 16 as described above.

The data source interface comprises a beginTransfersession( ) operation that may include instructions and data that can be performed by computer 12 to establish a data transfer session to enable computer 12 to receive data from PDA 16. Moreover, the beginTransfersession( ) operation may be passed parameters when invoked such as a context parameter. In embodiments, computer 12 passes its context object as a parameter to the beginTransfersession( ) operation when invoking it to inform PDA 16 of its identity for the same reasons described above with respect to computer 12 for providing PDA 16 with its context parameter when invoking the getUI( ) operation. PDA 16 may decide whether to transmit data to computer 12 or modify its behavior during data transfer based upon the contextual data provided in the context parameter. For example, if computer 12 requests a data transfer (e.g., file transfer) with PDA 16, PDA 16 may provide the data (i.e., the file) to a particular location at computer 12 (e.g., a root directory) or to another location (e.g., printer 14 or server 18) based upon the contextual data (e.g., the identity of the user at computer 12) included in the context parameter.

Each of the above-described interfaces and associated operations may comprise mobile code. Mobile code is executable data that can be transmitted to computer 12 where it may be executed. For example, Java is an implementation of executable content (i.e., mobile code) that is widely used on the Internet. Users may download mobile code from the Internet, for example, and locally run the program embodied by that code. In embodiments, the mobile code comprises object oriented mobile code, which is a programming methodology well known in the programming arts where data types may be defined along with associated procedures or sets of instructions, the data types in this context often referred to as classes. Thus, a set of procedures or instructions may be associated with one or more data types. Moreover, the same name or identifier can be assigned to identify a procedure or a set of instructions that perform corresponding instructions depending upon the particular data types associated therewith, often referred to as polymorphism. In embodiments, when the set of universal interfaces 16*a* is provided to computer 12, the procedures, sets of instructions and other data associated with the particular interface become available to computer 12 to access and perform as described herein. Still further, the interfaces may comprise sets of instructions or references to other interfaces, wherein computer 12 could utilize the data or perform the instructions accordingly.

In embodiments, using the above-described mobile code is optional. In particular, computer 12 may also directly access each of the interfaces included in the set of universal interfaces 16*a* without needing to access proxy object 16*b*. Further, the above-described operations would be available to computer 12 directly through each of the universal interfaces described above. In this example, the set of universal interfaces 16*a* would comprise the same instructions, sets of operations and/or other data that could be understood and performed by computer 12 to enable it to communicate with PDA 16 as well as the other functions described herein. Thus, in this example, mobile code may not be required although it could be used as necessary.

Data object 16*b* is a proxy object for PDA 16 and is received from PDA 16 and stored in computer 12, although the data object 16*b* may be stored elsewhere such as at server 18. The set of universal interfaces 16*a* is accessible to computer 12 through the data object 16*b*. More specifically, data object 16*b* supports the various operations defined by the interfaces in the set of universal interfaces 16*a* associated with PDA 16, which are assumed to be known and understood by computer 12. The data object 16*b* comprises instructions (i.e., computer executable code) and/or data that provide particular implementations of the one or more interfaces associated with the PDA 16 from which the data object 16*b* is associated with. For example, data object 16*b* provides a custom implementation of the contextual interface that would be specialized to communicate with PDA 16 using whichever protocols and/or data formats have been decided upon by the developer of PDA 16. In embodiments, computer 12 is programmed to access the set of universal interfaces 16*a* through data object 16*b* using a number of protocols to effect the different types of communications as described herein, such as Java remote method invocation ("RMI").

Figure 4:
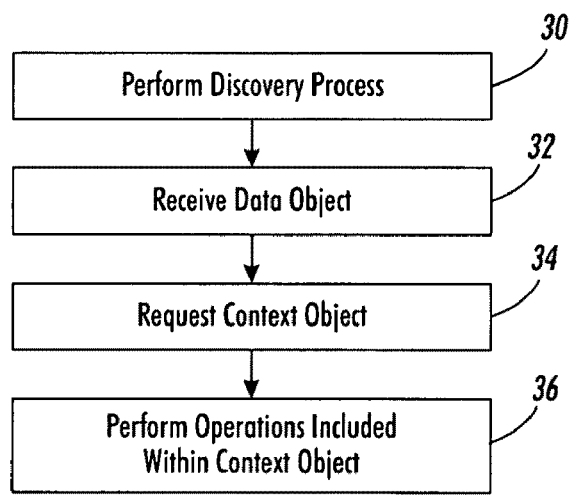
FIG. 4 is a flow chart of a process for providing context information.

Referring to FIG. 4 and beginning at step 30, computer 12 performs a discovery process to determine whether PDA 16 can provide it with contextual data. In embodiments, computer 12 discovers PDA 16 by using the Bluetooth™ Service Location Protocol ("SLP") discovery system developed by Bluetooth SIG, inc., and described in "Specification of the Bluetooth System," Version 1.1 core, Bluetooth Consortium 2001, although a number of other systems may be used such as the Universal Description, Discovery, and Integration Protocol ("UDDI"), developed by the Ariba, IBM and Microsoft Corps., and described in "UDDI Technical Whitepaper," Universal Description, Discovery, and Integration Consortium, pp. 1-12, 2000; "Universal Description, Discovery and Integration Data Structure Reference V 1.0," Ariba, Inc., International Business Machines Corporation and Microsoft Corporation, pp. 1-31, 2000; "Universal Description, Discovery and Integration Programmer's API 1.0," Ariba, Inc. and International Business Machines Corporation and Microsoft Corporation, pp. 1-67, 2000; and "Universal Description, Discovery and Integration Technical White Paper," Ariba, Inc., International Business Machines Corporation and Microsoft Corporation, pp. 1-12, 2000, the various Jini™ system discovery protocols or using a simple lookup in a name server, for example.

Next at step 32, discovered PDA 16 returns data object 16b to computer 12. Computer 12 may inspect the received data object 16b to determine which one or more universal interfaces are associated with PDA 16. Computer 12 determines that PDA 16 is at least associated with a contextual interface, and thus PDA 16 can provide it with contextual data.

Next at step 34, computer 12 uses the procedures, instructions and/or data defined in the data object 16b to invoke the getContext( ) interface associated with PDA 16 to request the context object 16c from PDA 16. As computer 12 requests access to the contextual data through the context object 16c, the instructions included in the object 16c may translate the requests into a first protocol (e.g., IR protocol) supported by PDA 16 to accomplish the access to the contextual data.

Next at step 36, computer 12 receives the context object 16c and invokes the associated getProperty( ) operation to retrieve the contextual data from the PDA 16. In particular, the contextual data is transferred from PDA 16 to computer 12 through the context object 16c. Moreover, when computer 12 performs the getProperty( ) operation, PDA 16 may return instructions, operations or data directly to computer 12 to enable it to understand the contextual data being transferred from PDA 16. Further, the context object 16c transmits the request for contextual data to PDA 16, although the object 16c may include the contextual data in which case computer 12 accesses the data therein. In either case, computer 12 receives the contextual data from the PDA 16.

In another embodiment, steps 30-36 are performed as described above in embodiments except at steps 30-32, computer 12 inspects the data object 16b and determines PDA 16 is also associated with the notification and user interfaces. Computer 12 may therefore register itself as a listener with PDA 16 to receive event notifications with respect to changes in the contextual data associated with PDA 16. At step 34, in this embodiment computer 12 may query PDA 16 about what particular types of contextual data, if any, it must provide to PDA 16 to register itself as a listener. Thus, step 34 is performed as described above and computer 12 requests the context object 16c, but here the instructions, data and operations included in the object 16c represent the particular types of contextual data computer 12 must include in the context parameter it provides to PDA 16 when invoking the register( ) operation associated with the notification interface. Step 36 is performed as described above and computer 12 invokes the register( ) operation to register itself and includes the required types of contextual data in the context parameter, although computer 12 may pass its own context object into the context parameter. PDA 16 decides to allow computer 12 to register as a listener and thus computer 12 may receive event notifications from PDA 16 as changes in its contextual data occur.

In another embodiment, steps 30-36 are performed as described above in embodiments except at steps 30-32, computer 12 inspects the received data object 16b and determines PDA 16 is also associated with a data source interface. Thus, PDA 16 may transfer other types of data with computer 12 besides its associated contextual data, such as a continuous stream of data (e.g., streaming video). At step 34, in this embodiment computer 12 may query PDA 16 about what particular types of contextual data, if any, it must provide to PDA 16 to utilize the data source interface for receiving data. Thus, step 34 is performed as described above and computer 12 requests the context object 16c, but here the instructions, data and operations included in the object 16c represent the particular types of contextual data computer 12 must include in the context parameter it provides to Next at step 54, computer 12 invokes the getProperty( ) operation included in data object 14b to retrieve the contextual data associated with printer 14. In this embodiment, the contextual data associated with printer 14 may be stored at a central location such as in server 18, although the contextual data may be stored at another location such as computer 12 or PDA 16. Thus, the instructions, operations or data included in the getProperty( ) operation that are executed by computer 12 instruct it to retrieve the contextual data associated with printer 14 from server 18. Moreover, the instructions, operations or data may include the location of the contextual data (i.e., server 18) on the network 20 and other miscellaneous instructions that may need executing by computer 12 to enable it to retrieve from and understand the contextual data being transferred from the server 18.

By way of example only, miscellaneous instructions may include instructions for contacting one or more location sensors (e.g., GPS, IR, etc.) and performing computations to integrate results obtained from the sensors to determine the location of the contextual data (i.e., server 18). Another example includes instructions for obtaining the contextual data by first attempting to access a particular service performed by one or more of components 16-18 on network 20 for providing contextual data, but using cached contextual data obtained from a prior request, if available, in the event the service is unavailable. Thus in this embodiment, computer 12 receives the contextual data associated with printer 14 from the server 18 through the context object 14c.

Utilizing Contextual Metadata

The ability for components to record contextual data allows the components to accrue a historical context for operations performed by or for the component. It also allows other devices to monitor the interactions between components and to accrue a historical context of the interactions. As will subsequently be described, the historical context can be used to simplify component usage in a ubiquitous computing environment. PDA 16 when invoking the beginTransfersession( ) operation associated with the data source operation. Step 36 is performed as described above, except computer 12 also invokes the beginTransfersession( ) operation to receive a data transfer session object and includes the required types of contextual data in the context parameter it provides when it invokes the operation. Computer 12 receives the data transfer session object and may execute instructions included in it to receive data from PDA 16. In this embodiment, PDA 16 may maintain a context parameter database in its associated memory. In particular, PDA 16 may store in the parameter database the context parameter provided to it by computer 12 in step 36. Thus, PDA 16 may store a number of context parameters that have been provided to it by one or more components 12-18 in performing step 36. The PDA 16 may use the stored context parameters to establish a history of use and may include the information in contextual data it provides to components 12-18, for example.

Figure 5:
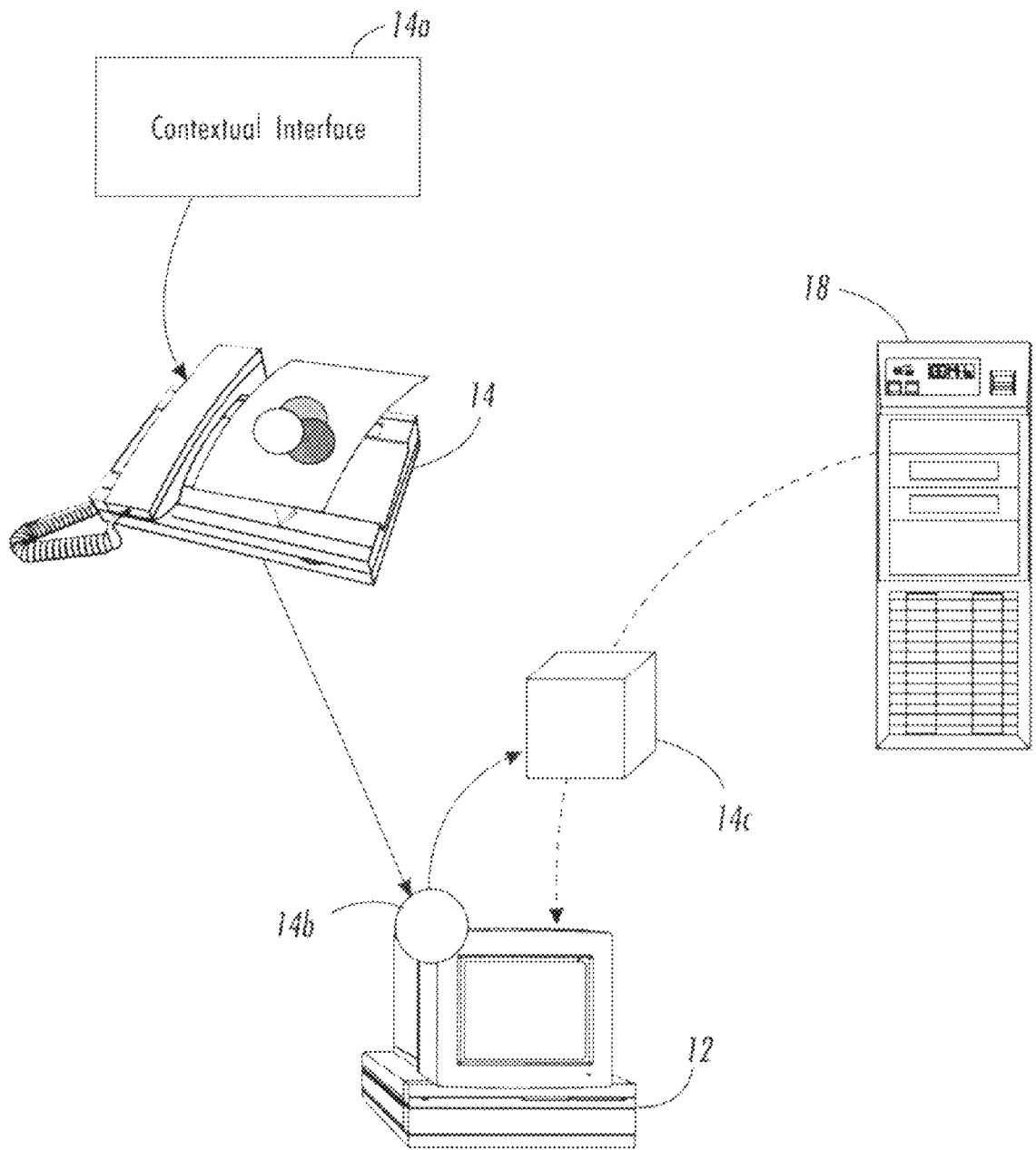
FIG. 5 is a partial perspective view of a system for providing context information in accordance with embodiments.

Referring to FIG. 5, computer 12, printer 14 and server 18 are coupled to each other as described above in connection with FIG. 1. In this embodiment, printer 14 is associated with a set of universal interfaces 14a comprising a contextual interface. The contextual interface in this embodiment is the same as the contextual interface described above in connection with FIGS. 3-5, except it includes instructions specific to printer 14 that may be executed by computer 12.

Figure 6:
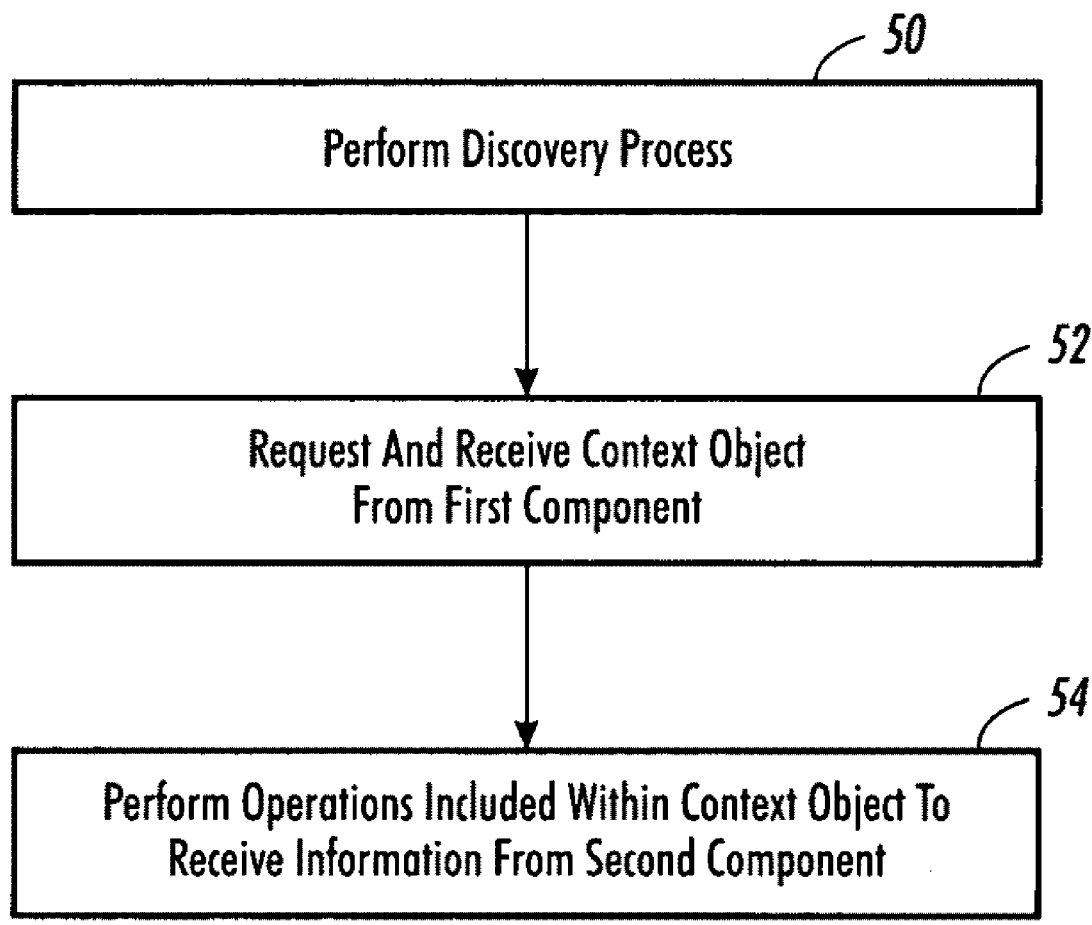
FIG. 6 is a flow chart of a process for providing context information.

Referring to FIG. 6 and beginning at step 50, computer 12 performs the discovery process described above with respect to FIG. 3 at steps 30-32 except it discovers data object 14b. Further, computer 12 determines printer 14 is at least associated with a contextual interface, and thus printer 14 may provide computer 12 with contextual data.

Next at step 52, computer 12 uses the procedures, instructions and/or data defined in the data object 14b to invoke the getContext( ) interface associated with printer 14 to request the context object 14c as described above with respect to FIG. 3 at step 34. Thus, computer 12 receives the context object 14c from the printer 14 through the data object 14b.

Components can be strongly associated with a human (for example a PDA, cell phone, or pager) or other biological creature that is able to operate the component. These components are termed entities. Other components do not have a strong association with a human and are simply identified as a component (for example, desktop computers, video projectors, etc. are all components).

Components include any device that has a context and that is able to reveal the context. A requester component interacts with a service component by sending the context of the requester component to the service component along with a request for an operation. Because the service component receives the context of the requester component, the service component can save the context of the requester component as well as identification of the requested operation. If the service component has the ability to use arbitrarily extensible data structures that allow arbitrary inclusion of arbitrary data, the service component can maintain a historical context of its interactions with other components as metadata. The context of the requester component can be combined with information from the context of the service component so that the historical context of the service component can include not just what was done, but what entity/component requested the operation, where and when the operation was requested, and the results of the requested operation.

In addition, a component can maintain a history of contextual changes (for example property changes) made by the component itself (for example, a component with a global positioning system can maintain a history of changes to its location property).

Contextual metadata includes property metadata and can include access control (permissions), access policy, and history. Access control determines what components/entities can access the context (or a particular contextual property in the context) or request the component/entity to perform an operation. The access policy determines the level of authentication required to identify the requesting component/entity accessing the service component, and the history context includes both a history of operations performed at the context level and the history of operations performed on a contextual property level. The contextual property level history maintains a log of all, or a selection of, updates to the property. Thus, it is possible to roll the property back to a prior state. One embodiment of the property history record is subsequently described with respect to FIG. 11.

One problem with ubiquitous computing environments is that user selection of components in the environment can be tedious and error-prone. By maintaining a history of past uses of the components (a history of use), a user can simply resurrect a previous configuration for reuse or modification. Furthermore, the historical metadata can be used to detect prior usage patterns, gather information for sensemaking, and to make inferences based on those patterns.

One aspect of an embodiment is that of maintaining metadata about contextual information. This contextual information can provide credibility and system behavior accounting. That is, credibility is enhanced by knowing who updated a given property, how recently it was updated and on what basis the current value is determined. Accounts of system behavior are provided by knowing the basis for the current values of the contextual properties as well as the explanations for actions taken to modify the contextual properties. For example, history can be kept about which component modified a particular property in a given component as well as tracking when the given component modified its own property.

The context from devices and/or operations can be stacked. By this we mean that a particular component/entity can contain the context of the other components/entities that have interacted with it (thus for example, the component's context can include a history of which components have interacted with the component, and the reasons for, and results of the interaction).

The context from components/entities can also be chained. That is, the context of each component can be added to the dataflow between the components. For example, suppose a requester entity requested that a presentation component (a service component such as a whiteboard) provide information (such as a scan of the whiteboard). The presentation information provided by the presentation component will include the context of the presentation component. Now, further suppose that the entity wants to store the information on a storage component (for example, a computer file system), the context of the storage component could also be included with the presentation information. In addition, the context of the entity (the component that requested the storage) could be included. Thus, the metadata in the presentation information provides the data's pedigree (that is, information about where the presentation data came from, what path the data took through the components, who initiated the connections, and etc.).

Metadata chaining allows a component to determine the entire history of the data it accesses. This information includes what component(s) was the source of the data, what components accessed and/or operated on the data, where and when the data was stored, etc. As each component provides the data, the providing component also provides its metadata with any existing metadata such that the receiving component can incorporate the existing metadata and the providing component's metadata with the receiving component's metadata.

Support for accreting historical metadata is provided by adding fields to the getProperty( ) and setProperty( ) methods; and adding a getPropertyHistory( )method:

```
Object getProperty(String key, RNC requester);
Void setProperty(String key, Object value,
    RNC requester, Cause cause, Date expiration);
History getPropertyHistory(String key, RNC requester,
    Date sinceWhen);
```

The requester argument can be a component, entity or application that may or may not be authenticated. The cause argument is defined by the requester and can be a token that can be given back to the requester to get more information about the reason for the update. In addition, both getProperty and setProperty can be extended to include a certificate proving the identity of the requester.

A requester component can obtain the historical metadata of another component to obtain a historical context of the other component or to obtain a value that meets particular credibility criteria. Thus, a requester component can reject updates on properties on the other component that were made by an untrusted or unauthenticated entity/component, updates that were made while the authentication mechanism was bypassed or values that have gone stale.

A component can also add self-initiated contextual changes to its historical context (for example, a component can monitor its location and log the changes in the component's location).

FIG. 7 through FIG. 11 illustrate one possible way that the metadata can be stored. Other mechanisms known in the art can be used (for example, but without limitation, storing metadata in a form such as:

```
SE.histcontext.operation02843.timestamp = May 27, 2001
SE.histcontext.operation02843.operation = create prop
    "location"
or
SE.histcontext.operation02843{
    Timestamp = May 27, 2001
    Operation = create prop "location"
    ...}
``` or any other representation).

Figure 7:
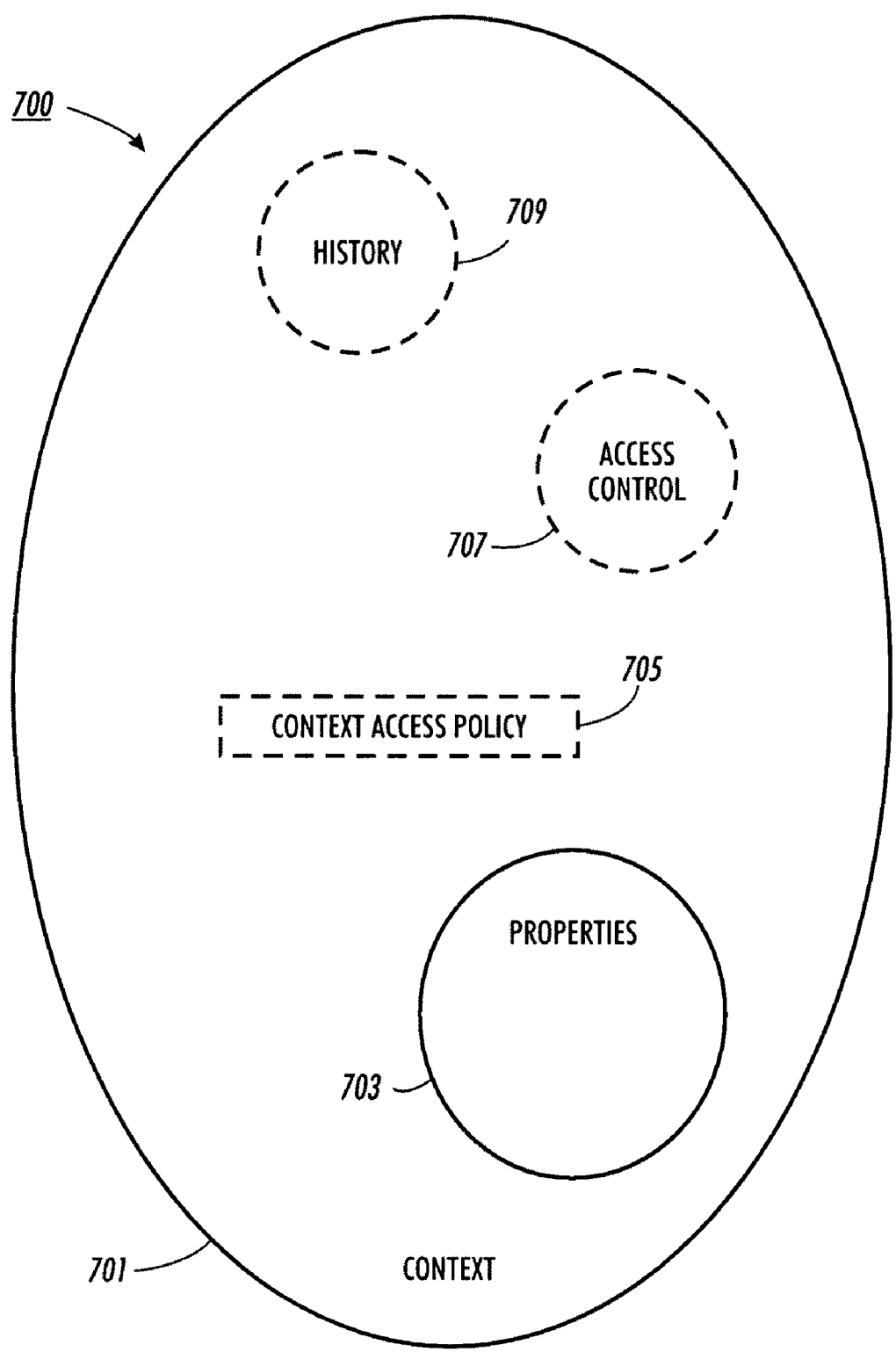
FIG. 7 is a diagram illustrating a component's context organization in accordance with embodiments.

FIG. 7 illustrates a context diagram 700 representing a context collection 701 that contains a property collection 703, and can include an optional context access policy 705, an optional access control collection 707, and an optional history collection 709. The context collection 701 and its components can be structured as a collection, an array, a linked list, a database, or any other structure suitable for storing metadata. The property collection 703 contains metadata for the properties of the component/entity associated with the context collection 701 and is further described with respect to FIG. 10.

The context collection 701 can include the optional context access policy 705. The optional context access policy 705 can be used to specify mechanisms for allowing access to the component. Some of these policies can require that the component authenticate the identification of an entity/component that is requesting access, and/or can implement or otherwise direct whether the identified entity/component can access the component containing the context collection 701. Example policies include denying access to otherwise-authorized entities who are at a different location than the service component; a bypass policy to allow a particular entity/component access (under control of the entity operating the service component) regardless of the default policy, and/or allowing access to a context monitor etc.

In addition, the context collection 701 can include the optional access control collection 707. The optional access control collection 707 can include metadata that associates access permissions with particular entities or types of entities. The optional access control collection 707 is further described with respect to FIG. 9.

Furthermore, the context collection 701 can include the optional history collection 709 that includes historical metadata representing the past operations on the component associated with the context collection 701. The optional history collection 709 is further described with respect to FIG. 8. Other, property-related, historical data is maintained in the property collection 703.

Figure 8:
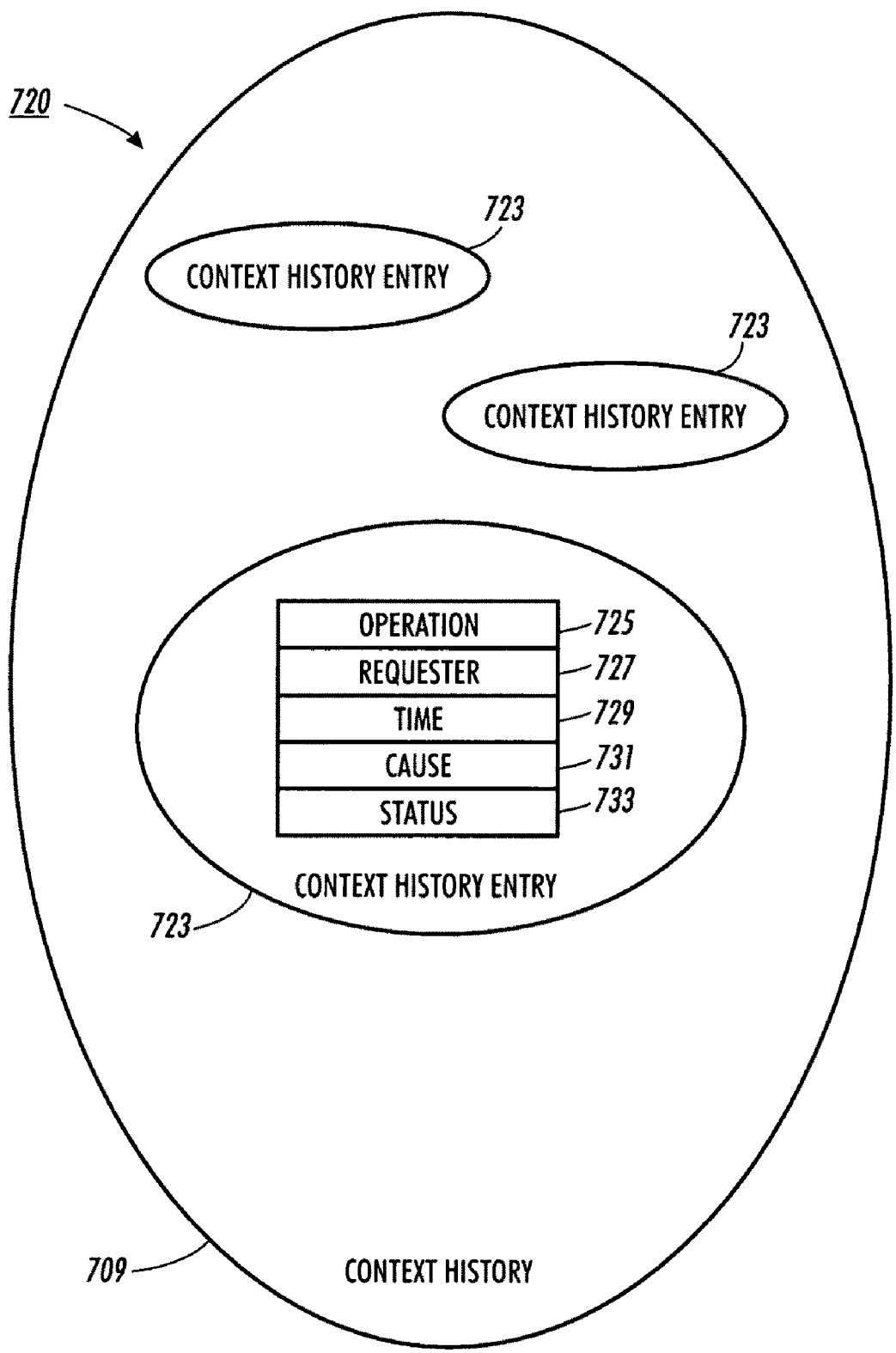
FIG. 8 is a diagram illustrating a component's context history organization in accordance with embodiments.

FIG. 8 illustrates a context history diagram 720 representing the context history collection 709. The optional history collection 709 contains at least a context history entry 723. The context history entry 723 can include an operation field 725, a requester field 727, a time field 729, a cause field 731 and a status field 733.

The operation field 725 contains information that indicates what operation was applied (or was attempted to be applied) to the context collection 701. These operations include, but are not limited to, the addition, deletion, maintenance and modification of the context's properties, access control, and history.

The requester field 727 contains information that identifies the entity and/or component that invoked the operation indicated in the operation field 725. The time field 729 contains a time stamp of when the operation was requested and/or performed. The cause field 731 contains information that indicates a reason for the operation as specified by the requesting component/entity. The cause field 731 can be empty. The status field 733 can contain various status states that help manage the context history entry 723.

The context history collection 709 can be used to aggregate a usage history of an entity's/component's context. The optional history collection 709 need only include history about property deletions and additions. History about a particular property (or other entry in the context collection 701) can be maintained as part of the property context (for example, see FIG. 10 and FIG. 11).

Figure 9:
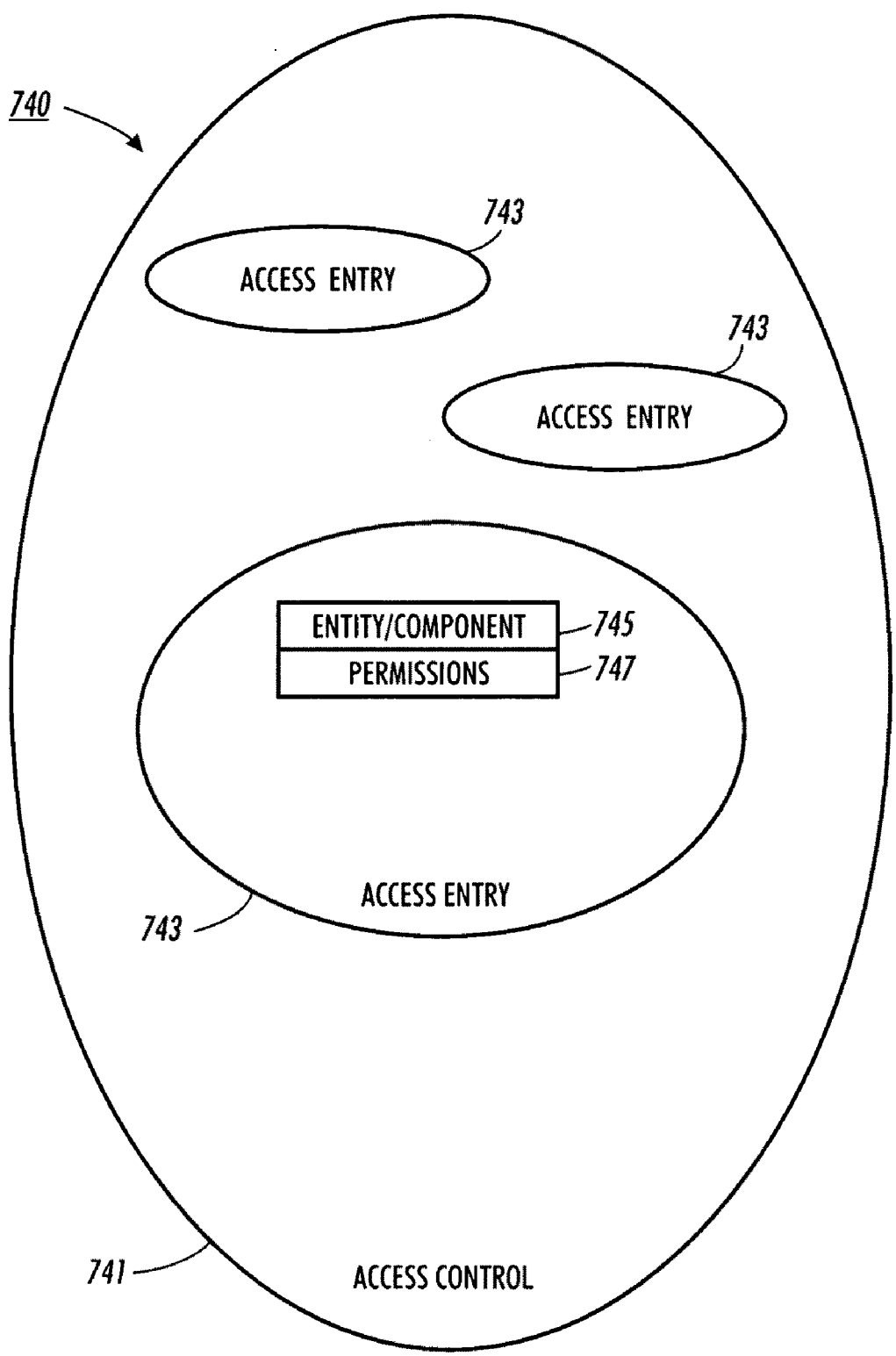
FIG. 9 is a diagram illustrating a component's context access control organization in accordance with embodiments.

FIG. 9 illustrates an access control diagram 740 representing an access control collection 741 that contains an access entry 743. The access entry 743 includes an entity/component record 745 that identifies the entity or component that has permission (stored in a permission record 747) to access the context (see the optional access control collection 707) or property (see FIG. 10) associated with the access control collection 741. One skilled in the art will understand that the permissions generally include read, write, and modify permissions but can include other permissions. In some embodiments, the access control collections for the context and for the contextual property have similar structure.

The entity/component identified by the entity/component record 745 can be a single user, a group of users, a component, a type of component or other identifiable entity and/or component.

Figure 10:
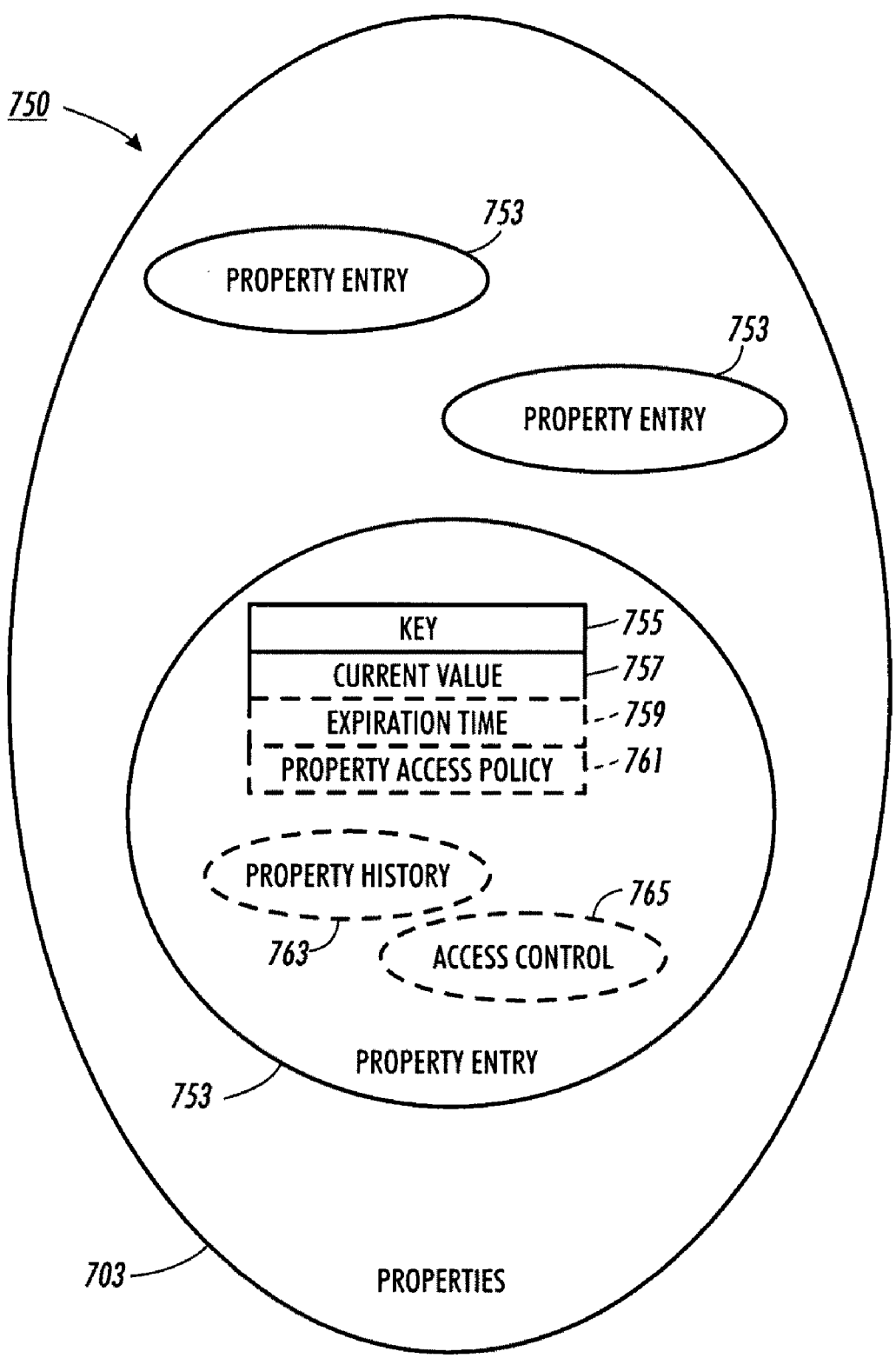
FIG. 10 is a diagram illustrating a component's property organization in accordance with embodiments.

FIG. 10 illustrates a context property diagram 750 representing the property collection 703 that contains a property entry 753. The property entry 753 can include a key field 755 that contains the property's identification and a current value field 757 that contains the property's value. The property entry 753 can also include an optional expiration time field 759, and an optional property access policy field 761.

The key field 755 contains a property identifier (generally in human readable text and possibly subject to internationalization).

The optional expiration time field 759 allows a component that is setting a property value to indicate when the value is expected to become stale (untrustworthy). An example of this would be if an entity is attending a meeting and having another component set the entity's location property to be the location of the meeting and the optional expiration time field 759 to coincide with the scheduled end of the meeting. Thus, if the entity sent its context to another component when out of the meeting, the other component would be able to determine that the entity's location property could be stale.

The property entry 753 can include the optional property access policy field 761 that can be used to direct whether the entity/component (that may have been authenticated as directed by the optional context access policy 705) can access and/or operate on the property containing the optional property access policy field 761. Example policies can include those that deny access to otherwise authorized entities who are at a different location than the service component; a bypass policy to allow a particular entity/component access (under control of the user operating the given component) regardless of the existing policy, and/or a policy that allows access to any context monitor etc.

In addition to the primary key/value characteristics, the property entry 753 can include an optional property history collection 763 and/or an optional access control collection 765.

The optional access control collection 765 structure can be (but need not be) the same as the access control collection 741 but applied to a property instead of the context.

The optional property history collection 763 generally is different from the context history collection 709 and is used to aggregate a history of use and/or modifications to a particular property. The optional property history collection 763 is described with respect to FIG. 11.

Figure 11:
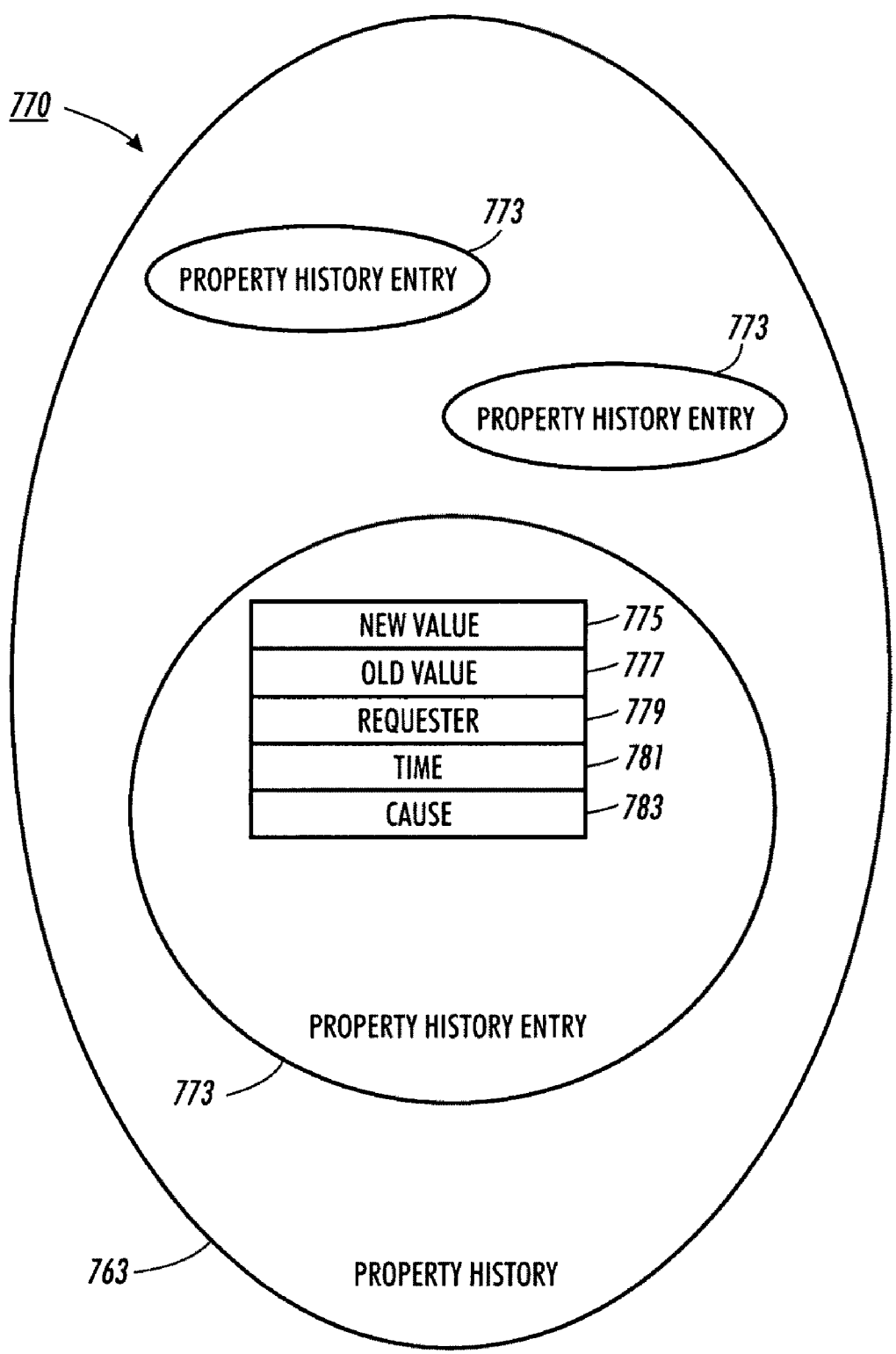
FIG. 11 is a diagram illustrating a component's property's history organization in accordance with embodiments.

FIG. 11 illustrates a property history diagram 770 representing the property history collection 763 that contains a property history entry 773. The property history entry 773 can be used to maintain a history of modifications to a particular property. The property history entry 773 can include a new value field 775, an old value field 777, a requester field 779, a time field 781, and a cause field 783.

The new value field 775 stores a copy of the value set into the current value field 757 as of the time indicated in the time field 781. The old value field 777 stores the value of the current value field 757 just prior to time indicated in the time field 781. The requester field 779 stores a value that identifies the component/entity that caused the change in the property. The cause field 783 can contain a value that indicates why the property was changed.

One skilled in the art will understand that the information stored in the property history entry 773 can be represented with different fields while still being equivalent to what is disclosed herein.

By maintaining the context history collection 709 and the property history collection 763, a component accumulates a historical context of interactions between it and other components. In addition, a context monitor can also accumulate a historical context of interactions between components within the environment served by the context monitor. Each component has a component context that can be revealed to another component or context monitor. Operations between components are instigated by a requester component sending an operation request and the requester component's context to a service component. The service component can record the requester component's context as service component contextual metadata (for example, as part of the history entry in the history object). The operation and the requester component's context can also be recorded by other components or context monitors (for example, the requester component can also make a record of the requested operation). The accretion of the recorded metadata results in historical metadata that can be used to simplify future interactions between components.

In addition, a component can modify its own properties and these modifications are also accumulated in the historical context of the component.

One skilled in the art will understand that the previously described contextual organization is but one possible organization. Other organizations (for example, but without limitation, those that do not segregate history and protection metadata between the context and property) are equivalent to the organization previously disclosed.

Figure 12:
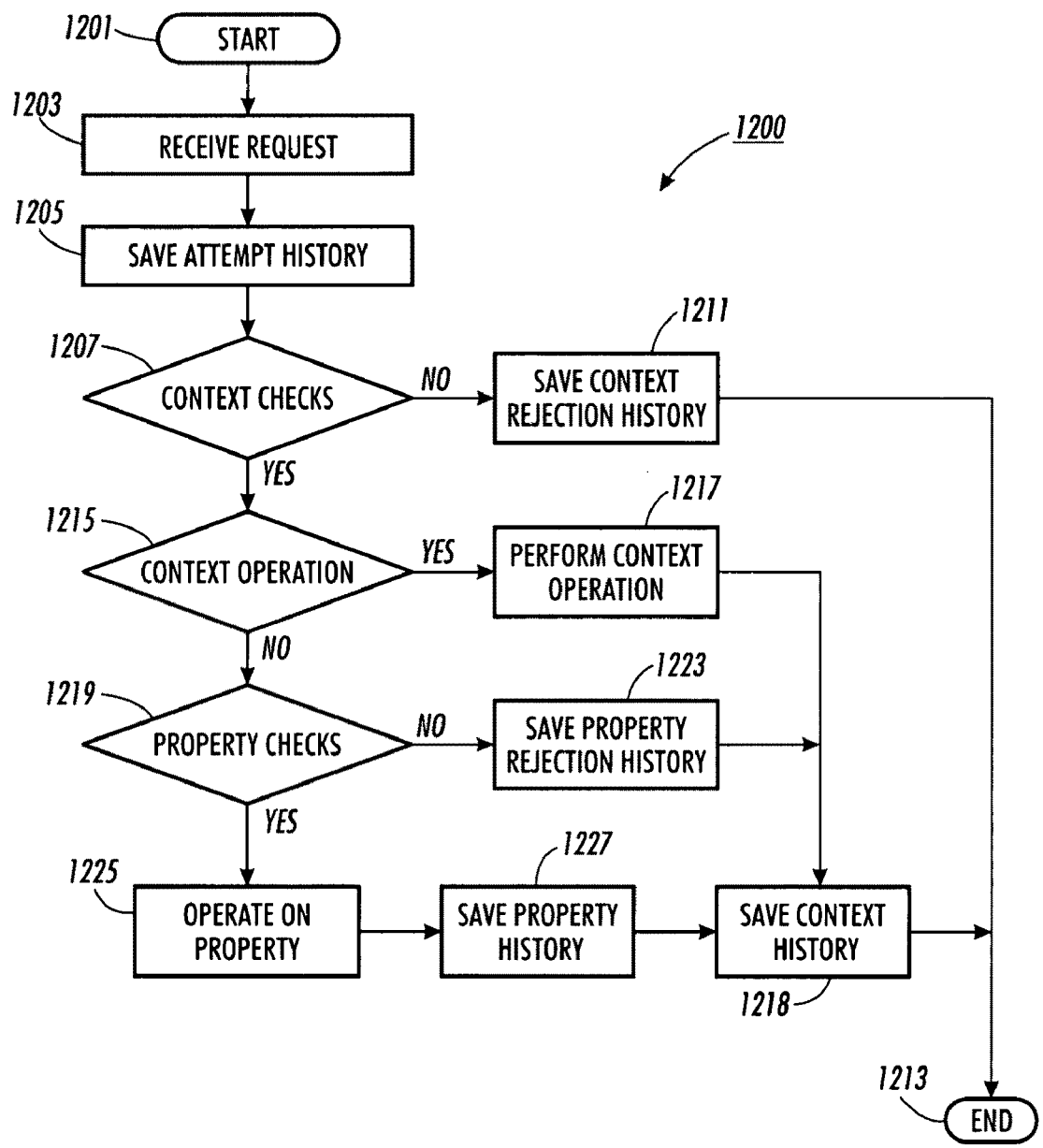
FIG. 12 illustrates a context access process in accordance with an embodiment.

FIG. 12 illustrates a context access process 1200 that initiates at a 'start' terminal 1201 and continues to a 'receive request' procedure 1203. The 'receive request' procedure 1203 receives an operation and context from a requester component using an available communication mechanism (for example, a wired, wireless, infrared, fiber etc. network as well as direct point-to-point communication mechanisms). Operations include those that allow properties to be defined and deleted at the abstraction level of the context collection 701, allow properties to be modified and accessed (including property history) at the abstraction level of the property collection 703, allow context history to be accessed at the abstraction level of the context collection 701, and other operations for access to, and maintenance of the component's context.

Once the request is received, the context access process 1200 continues to a 'save attempt history' procedure 1205 that saves a context history entry 723 having a status (that can be stored in the status field 733) of incomplete. Next, a 'context access checks' decision procedure 1207 uses the optional context access policy 705 (if authentication is enabled) and the optional access control collection 707 (if enabled) to verify the identity of the requester component (if required by the optional context access policy 705) and verify that the requester component is authorized to perform the requested operation at the abstraction level of the context collection 701.

The 'context access checks' decision procedure 1207 performs a number of checks on the entity/component that requested the operation. These checks can include at least one or more of: 1) allowing all operations by any entity/component; 2) authenticating the entity/component's identification (for example, by using certificates or other identify authentication mechanisms known in the art); 3) verifying that an entity/component has permission to perform the requested operation; 4) checking whether a user-specified override exists for a particular entity/component (this allows a user of a component to personally perform the authentication function thus, a user can visually verify that a particular entity has requested the function, and for that user to allow the operation to take place); and any other check defined by the optional context access policy 705 or required by the optional access control collection 707.

If the 'context access checks' decision procedure 1207 denies access to the requester component/entity, the context access process 1200 continues to a 'save context rejection history' procedure 1211 that logs (records) the attempted operation (possibly including the context of the requester component/entity and the reason for the denial of access) and updates the status field 733. Then the context access process 1200 completes through an 'end' terminal 1213. In addition, the requester component/entity can also be informed of the access denial.

However, if the 'context access checks' decision procedure 1207 allows the requester component/entity to access the context collection 701, a 'context operation' decision procedure 1215 determines whether the requested operation is to be performed at the abstraction level of the context collection 701. If so, the context access process 1200 continues to a 'perform context operation' procedure 1217 that performs the requested operation (example operations include creation/deletion of properties and accessing the optional history collection 709).

Once the requested operation is completed (whether successful, or unsuccessful), the context access process 1200 continues to a 'save context history' procedure 1218 that saves the result of the operation in the optional history collection 709 in the history record saved by the 'save attempt history' procedure 1205 and that updates the value of the status field 733 accordingly. Then, the context access process 1200 completes through the 'end' terminal 1213.

However if at the 'context operation' decision procedure 1215 the requested operation is not to be performed at the abstraction level of the property collection 703, the context access process 1200 continues to a 'property access checks' decision procedure 1219 that locates the identified property using the key field 755 field in the property entry 753 and can perform checks similar to those performed by the 'context access checks' decision procedure 1207 (but within the abstraction level of the property collection 703 and the property entry 753 itself using the optional property access policy field 761 and/or the optional access control collection 765. If the requested operation is not allowed, the context access process 1200 continues to a 'save property rejection history' procedure 1223 that adds a new property history entry 773 to the optional property history collection 763 showing that the requested operation on the property was rejected. Next, the context access process 1200 continues to the 'save context history' procedure 1218 to update the status field 733 and completes through the 'end' terminal 1213.

If at the 'property access checks' decision procedure 1219 the requested operation was allowed, the context access process 1200 continues to an 'operate on property' procedure 1225 that attempts the requested operation on the identified property. The status of the results of the requested operation is provided to the 'save property history' procedure 1227 that can add a new property history entry 773 to the optional property history collection 763—thus, accruing the status and results of the requested property operation. Next the context access process 1200 continues to the 'save context history' procedure 1218 to update the status field 733 and completes through the 'end' terminal 1213.

One skilled in the art will understand that the component's context only need include the property collection 703. Some embodiments enable one or more of the optional features of the context collection 701.

Operations allowed on a component's context can include adding or deleting a property from the property collection 703, read access to the optional history collection 709 (if enabled), and any allowed changes to the optional access control collection 707 (if enabled). The history of changes to any particular property is stored with the property itself in the optional property history collection 763.

Operations allowed on a property can include changing the value of the current value field 757 and/or the optional expiration time field 759, accessing these values, or accessing the optional property history collection 763.

Based on the previous discussion, one skilled in the art will also understand how to provide read access to the optional history collection 709, and how to have an entity independently update its own history (for example, to update a location property).

Figure 13:
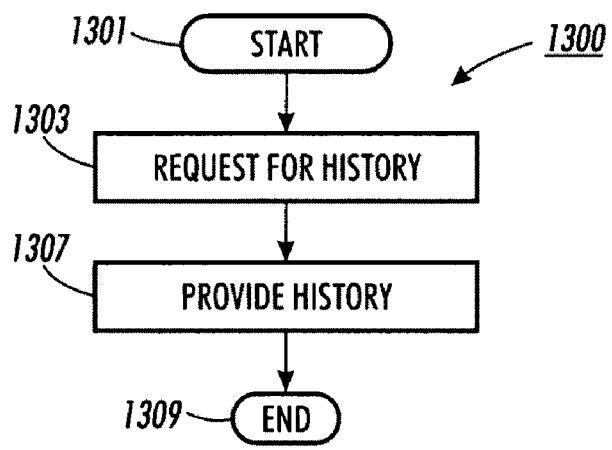
FIG. 13 illustrates a process for delivering historical context in accordance with an embodiment.

FIG. 13 illustrates a history delivery process 1300 that can be used by a service component to provide its historical metadata. The history delivery process 1300 initiates at a 'start' terminal 1301 on receipt of history request invoked from a requester component (a history retrieval mechanism for example, resulting from invocation of the getPropertyHistory( )method). The history delivery process 1300 continues to an 'inspect request for history' procedure 1303 that can verify that the request is well formed. A 'provide history' procedure 1307 assembles the requested historical metadata, sends the assembled metadata to the requester component and completes through an 'end' terminal 1309.

Once the entity's/component's context contains historical and access information, a requester component/entity can request historical and permission information from other entities/components and determine which of those components are accessible to the requester component/entity, and can prioritize options for the user based on the available historical context. This prioritization can be based on the identity of the entity (such as a person's name, their location, preferences and usage history), of the component (supported data types, location, location requirements, usage history, and security policies), and/or information available from a context monitor. This information can be requested from the components in the environment, filtered to remove components that cannot be used (for example, because of conflicts with access priorities), altered based on the entity's preferences and responsive to the situation in the environment (for example, determining the probability that a meeting is in progress (by monitoring the entities in attendance) and determining what components are most likely to be used (based on the history of the attendees)). This information can be used by a configuration reconstruction mechanism to determine what configuration of components could be established by a configuration establishment mechanism.

The component discovery service generally returns information about all the entities/components to which the discovering component has access. This often provides an overwhelming amount of information to a user of the discovering component. A user can provide a template to filter out components that are not of interest to the user. Examples of such templates are single or combinations that allow: specification of a unique or wildcarded field, components that have particular interfaces, and/or components that have particular properties or property values. For example, the template can specify a specific unique ID, implemented component interfaces, or text attributes such as the name of the component or the name of the physical room where the component is located.

One embodiment provides a way of prioritizing and filtering component query results based on background contextual information of both the requester component/entity and the components being queried. Contextual information for an entity can include information such as identity, location, preferences, and usage history. Contextual information for components can include information such as supported data types, location (if it has one), location requirements, usage history, and security policies. The entity and component information can be combined to filter out components that cannot be used by a given entity/component due to access control restrictions. This information can also be combined to prioritize the presentation of available components/entities based on what might be most useful to the user in the current situation.

Contextual information can be categorized in two ways: dynamic vs. static, and state vs. requirements. The context state represents the values of the properties of the context. Requirement context represents the prerequisites for the use of a given component/entity. Dynamic context is that where the context information is being updated on-the-fly (such as a global positioning system maintaining a "location" property). Static context is specified when defined and does not change until redefined (for example, a person's name). This representation of context is independent from how the context is actually acquired and verified.

One embodiment can augment these attributes with additional static contextual requirements, such as data type, identity access control, and location access control. A component that cannot fulfill all of the specified requirements can be immediately filtered out from the list of components presented to the user. In other words, components have contextual requirements, entities (people) have static and dynamic context state, and the state and requirements can be combined when filtering.

As an example of filtering assume the following metadata:

```
ComponentA
Name: Video Projector
Data types: { jpg, gif, png }
Identity Access Control: {*@parc.com }
Location Access Control: {PARC:{2nd floor, 3rd floor}:* }
[...]
PersonA
Identity: john@parc.com
Location: {PARC:3rd floor:3100 }
[...]
PersonB
Identity: tom@parc.com
Location: {PARC:1st floor:1000 }
[...]
PersonC
Identity: xyz@xyz.com
Location: { unknown }
[...]
```

Here, ComponentA has the "Name" of "Video Projector", it accepts "Data types" of "jpg, gif, and png". It also requires the entity requesting its services to have an Identity of "*@parc.com" (being anyone from PARC), as well as the requirement that the entity must also be on the $2^{nd}$ or $3^{rd}$ floor of PARC before ComponentA can be used.

In this case, PersonA can access ComponentA because PersonA matches all of the requirements. PersonB cannot access ComponentA because PersonB does not match the Location requirement, and PersonC cannot access ComponentA because PersonC does not match either of the Identity or Location requirements.

Thus, filtering can reduce the number of components that are presented to a user. Additional help can be provided by prioritizing the presented components. One skilled in the art will understand that other filters, or combinations of filters can provide more complex filtering capability than the simple "and" filter previously described (for example, generalized boolean operations).

Yet another aspect of an embodiment is to combine the entity's usage history with the component's usage history and prioritizing the returned components by popularity (or other metric). The popularity metric is attractive because components that have been used in the past are likely to be used again in the future.

As an example of prioritizing, assume the following metadata:

```
ComponentA
Name: Video Projector
Usage History: {
{
event-ID: 12345
used-with: ComponentB
username: john@parc.com
location: PARC:3rd floor:3100
time: Dec 12 2001, 5:15PM
...
}
{
event-ID: 12346
used-with: ComponentC
username: john@parc.com
location: PARC:3rd floor:3100
time: Dec 12 2001, 5:18PM
...
}
{
event-ID: 12347
used-with: ComponentB
username: jdoe
location: PARC:3rd floor:3200
time: Dec 12 2001, 6:00PM
...
}
}
Usage History Index by Location: {
PARC:3rd floor:3100 { 12345, 12346 }
PARC:3rd floor:3200 { 12347 }
}
Usage History Index by Component: {
ComponentB { 12345, 12347 }
ComponentC { 12346 }
}
```

In this example, ComponentA has three events registered in its history. It also has two indexes. An entity could use just the usage history index of a component to prioritize that component in the list of available components. For example, if an entity was searching for what components could be used with ComponentA, ComponentB would be listed first since it has been used more than the other components, ComponentC would be listed second because it has been used less than ComponentB, but more than any other component and any other components would be tied for third, since they have not been used with ComponentA at all.

An entity could also use both the history and location indexes for prioritizing. In this case, if the entity were in PARC:3rd floor:3200, then ComponentB would have a higher priority because it had previously been used there.

One way to filter and prioritize the available components/entities and/or component interactions is to apply a process that filters and prioritizes their historical information (either in the way just previously described, or using other filters).

Figure 14:
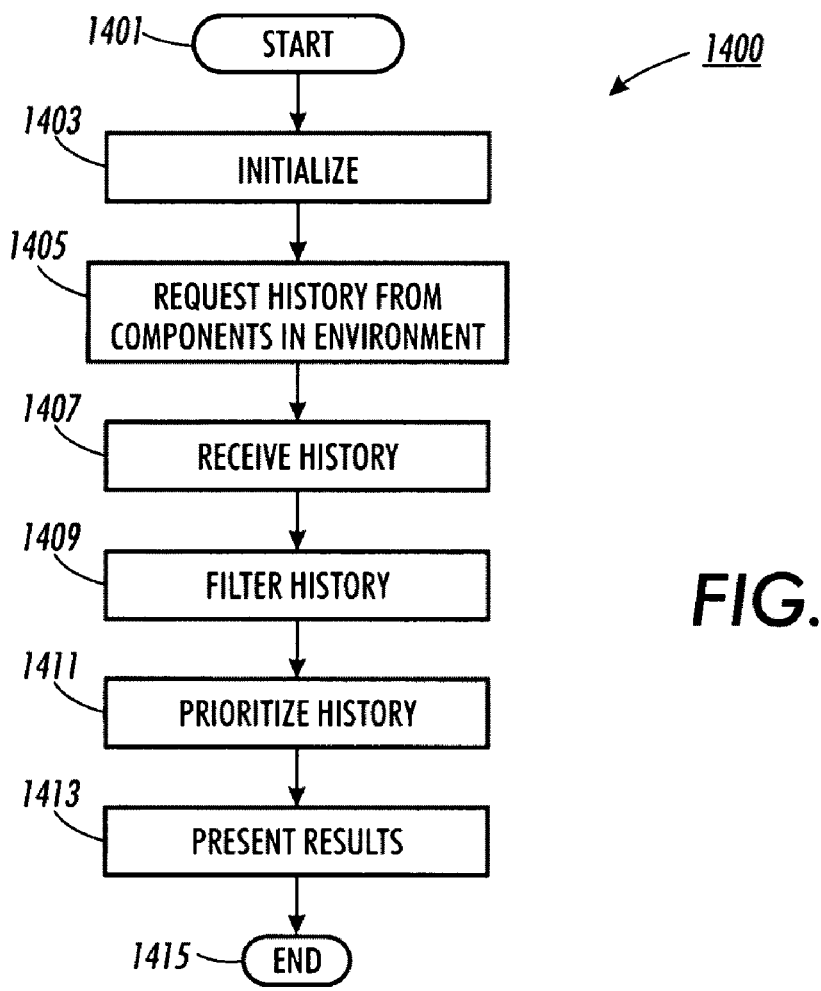
FIG. 14 illustrates a filter/prioritization process in accordance with an embodiment.

FIG. 14 illustrates a filter/prioritization process 1400 that can be used to gather historical context from the components in the environment. The filter/prioritization process 1400 initiates at the 'start' terminal 1401 at the request of a user, an entity, detection of a change of environment, or any other trigger. The filter/prioritization process 1400 continues to an 'initialization' procedure 1403 that performs any required initialization (such as selecting filter characteristics and/or assigning prioritization parameters) and then to a 'request history' procedure 1405. The 'request history' procedure

1405 first detects what components are in the environment and then sends a request history command as well as the context of the originating component (using the getPropertyHistory( ) method) to each relevant component/entity in the environment. A 'receive history' procedure 1407 receives the history from the components/entities (some components/entities may deny access to the requester component) as they reply to the request from the 'request history' procedure 1405 (see FIG. 13). The requester component can then filter and prioritize components based on the component's history information and/or the received historical information as specified by the specified filter characteristics using a 'filter components based on history' procedure 1409. The results of the 'filter components based on history' procedure 1409 are then provided to a 'prioritize components based on history' procedure 1411 that orders the results according to the prioritization parameters. The prioritized information identifying components can then be presented by a 'present results' procedure 1413 a an ordered list of components such that an entity/component can select which components to use, based for example, on their past historical context as well as other available information. Finally, the filter/prioritization process 1400 completes through an 'end' terminal 1415. One skilled in the art will understand that there are many approaches that can be taken to filter and/or prioritize the contextual information for a user and that these approaches are to be considered as equivalent to that described herein.

The results of the 'present results' procedure 1413 can be presented to a user using any presentation device or method including auditory, visual, tactile or other means of presenting information. The 'present results' procedure 1413 can also encompass sending the results to another component for storage and/or presentation by the other component.

Contextual requirements for components can be matched with contextual state for users at run-time to filter out components that cannot be utilized. Historical context for components can be combined with historical context for entities to prioritize components according to popularity. Although the filter and prioritization techniques can be used separately, they can also be combined to give entities a better understanding of what components might be useful in a given situation.

There are circumstances when filtering and prioritizing are insufficient for providing assistance in selecting components. One example of this is a meeting room environment where there can be many different devices used during the meeting and many different entities attending the meeting. In this environment, and many others, a context monitor can be used to assist in managing the available components.

In a ubiquitous computing environment where a substantial number of entities/components maintain their own historical context, it is possible to make inferences about the environment or the use of the environment within which the entities/components are located. Thus, as the situation in the environment changes, the relative importance of the entities/components can also change. For example, during a presentation, the media devices in the room are most likely of key interest to the presenter while components such as an image conversion service or a character recognition component would be less important. Conversely, there are other situations where the latter components could easily be more significant than the other devices in the room.

One embodiment is a context monitor or system of context monitors that can observe an environment (for example, a room, a building, a campus), a group of components/entities and/or information (such as the day of year and time). These monitors need not be components in that they need not combine with components, rather, the context monitor's function is to observe what components/entities enter the monitored environment for which the context monitor is responsible and to provide a situational assessment of the environment.

For example, a context monitor for a conference room can have within its domain, all the presentation media within the conference room. The context monitor can also monitor the entities within the room (for example, who and how many people are in the room), as well as environmental controls such as lighting and temperature. The context monitor can also maintain a history of previous events. The context monitor can detect that a certain number of people are inside the room and analyze the information to infer a situational assessment of the environment (for example, the situational assessment can recognize that a presentation is possibly intended and therefore increase the priority of the room's component's location contextual property so that the devices in the room are more easily accessible to users in the room). The context monitor can also increase the priority of software components that are generally used to give presentations.

The context monitor can observe and record any actions taken on the components in the room and this information can be fed to an inference engine. The data collected by the context monitor about actions on components can also be filtered and provided to components/entities as well as to the inference engine. Components can be monitored by more than one context monitor (an entity, for example, may be associated with a context monitor for the entity's office as well as a context monitor for the entity's project group).

Figure 15:
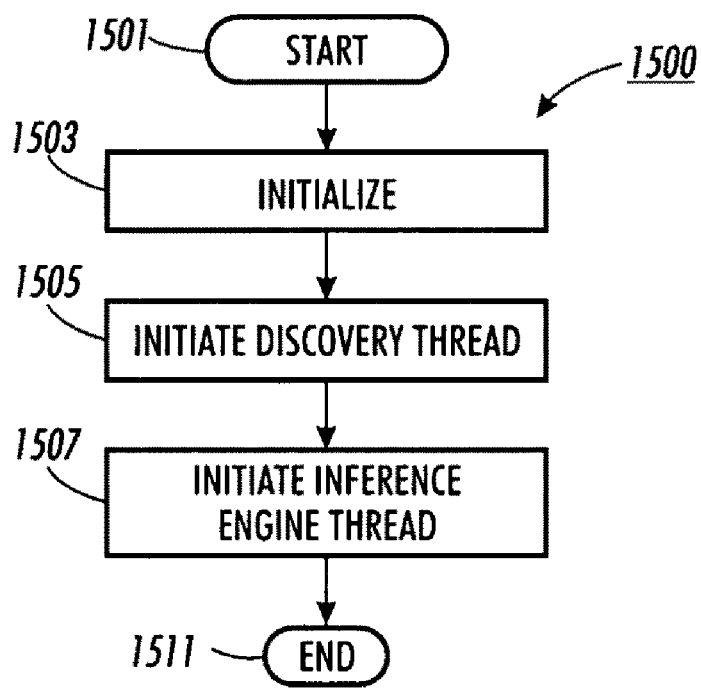
FIG. 15 illustrates a process for initializing a context monitor in accordance with an embodiment.

FIG. 15 illustrates a context monitor initialization process 1500 that can be used to initiate a context monitor. The context monitor initialization process 1500 initiates at a 'start' terminal 1501 when the context monitor service is started and continues to an 'initialization' procedure 1503 that performs any required initialization. Next, the context monitor initialization process 1500 initiates a number of threads using an 'initiate discovery thread' procedure 1505, and an 'initiate inference engine thread' procedure 1507. One skilled in the art will understand that although FIG. 15 indicates that these threads are initiated in a particular sequential order; other equivalent embodiments can initiate the threads in a different order. After the threads are initiated, the context monitor initialization process 1500 completes through an 'end' terminal 1511.

Figure 16:
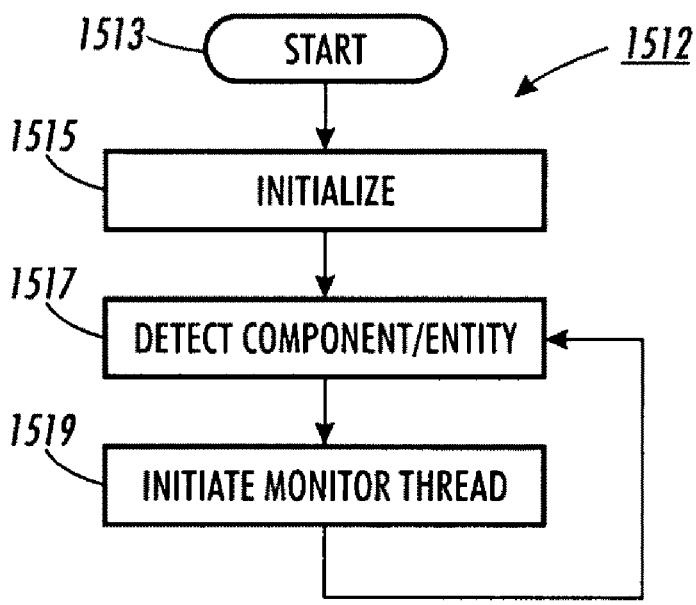
FIG. 16 illustrates a context monitor discovery thread in accordance with an embodiment.

FIG. 16 illustrates a discovery thread 1512 that can be invoked by the 'initiate discovery thread' procedure 1505 and that initiates at a 'start' terminal 1513. Once initiated, an 'initialization' procedure 1515 performs initialization for the thread (such as allocating resources etc.) and the discovery thread 1512 continues to a 'detect component' procedure 1517. The 'detect component' procedure 1517 discovers the other entities/components in the environment. As each entity/component is discovered, the discovery thread 1512 initiates an 'initiate monitor thread for component' procedure 1519 that initiates a thread (subsequently described with respect to FIG. 18) to monitor communications and operations between the discovered component and other components in the monitored environment. The discovery thread 1512 then returns to the 'detect component' procedure 1517 to discover additional entities/components in the environment.

Figure 17:
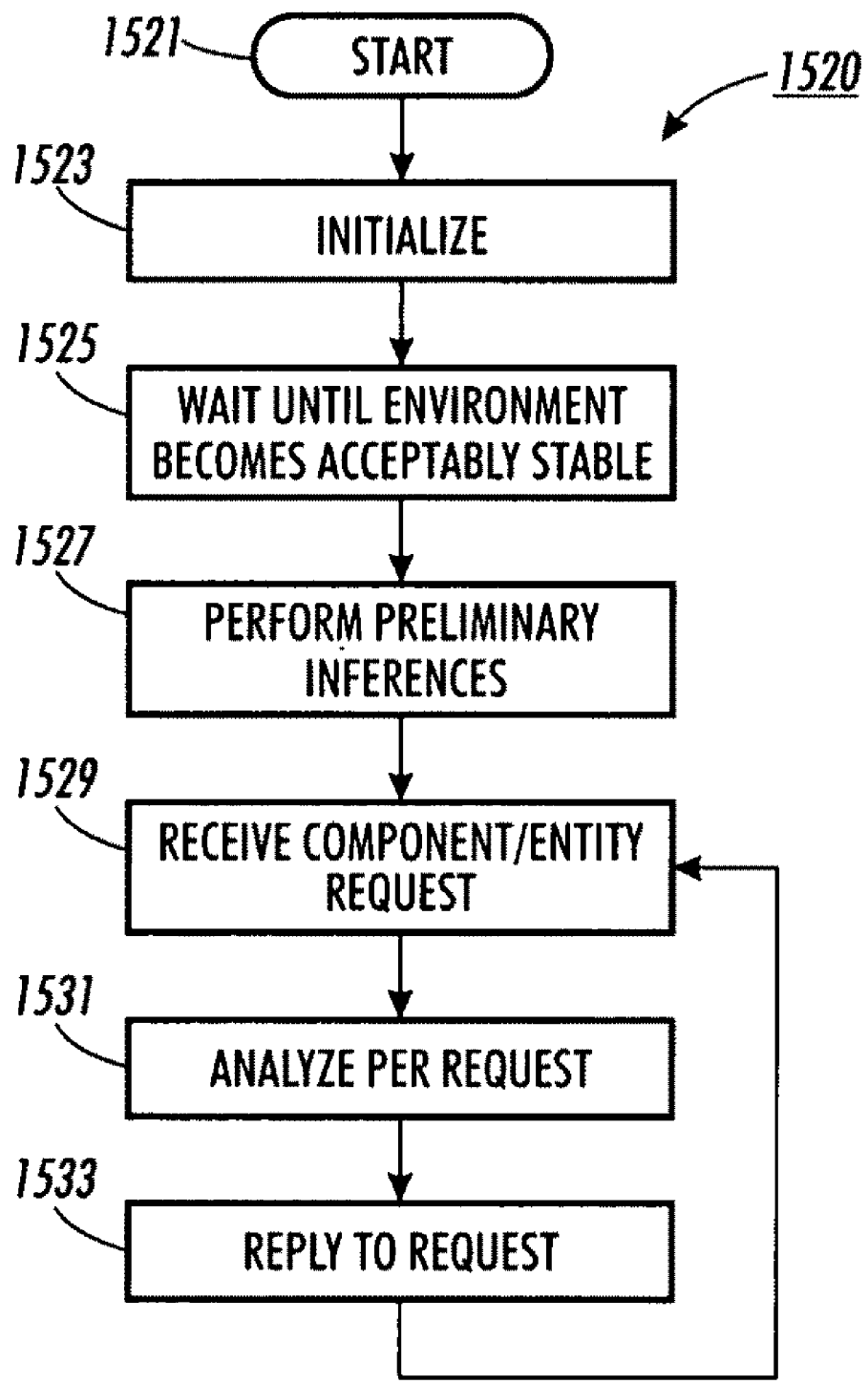
FIG. 17 illustrates an inference engine thread in accordance with an embodiment.

The 'detect component' procedure 1517 can detect the entities/components in any number of ways. These ways include snooping network traffic, using device detection protocols and then subscribing to the detected device, or by being subscribed to by a device that wants to be monitored; or discovered using discovery protocols such as Bluetooth, Jini or others FIG. 17 illustrates an inference engine thread 1520 that can be invoked by the 'initiate inference engine thread' procedure 1507. The inference engine thread 1520 initiates at the 'start' terminal 1521 and continues to an 'initialization' procedure 1523 to perform any required initialization functions (such as allocating resources, opening an inference database, starting an inference engine, etc). Next, the inference engine thread 1520 continues to an 'environment stability determination' procedure 1525 that monitors the activity of the discovery thread 1512 to determine when the environment monitored by the context monitor is sufficiently stable to support reasonable inferences. The inference engine itself can be used to help make this determination and can consider the past use of the monitored environment, the date, time, status of networked calendaring systems and other information available to the inference engine.

Once the 'environment stability determination' procedure 1525 is satisfied, the inference engine thread 1520 continues to a 'preliminary inference analysis' procedure 1527 that analyzes the entities/components that were detected to be in the environment to make a preliminary assessment of the environmental situation. One skilled in the art will understand that the 'preliminary inference analysis' procedure 1527 need not be present in all embodiments.

Next, a 'receive entity/component request' procedure 1529 waits for requests from a requester component (or other computer in communication with the context monitor, or operator requests). When a request is received, the inference engine thread 1520 continues to an 'analyze per request' procedure 1531 that applies the inference engine to the situation in light of the request—possibly using the results from the 'preliminary inference analysis' procedure 1527. The results from this analysis is returned to the component/entity/computer at a 'reply to request' procedure 1533 and the inference engine thread 1520 returns to the 'receive entity/component request' procedure 1529 to process the next request.

The inference engine can use any of a number of inference technologies (for example, Bayesian Networks, Hidden Markov models, and/or Neural Networks as well as other machine learning technologies).

Figure 18:
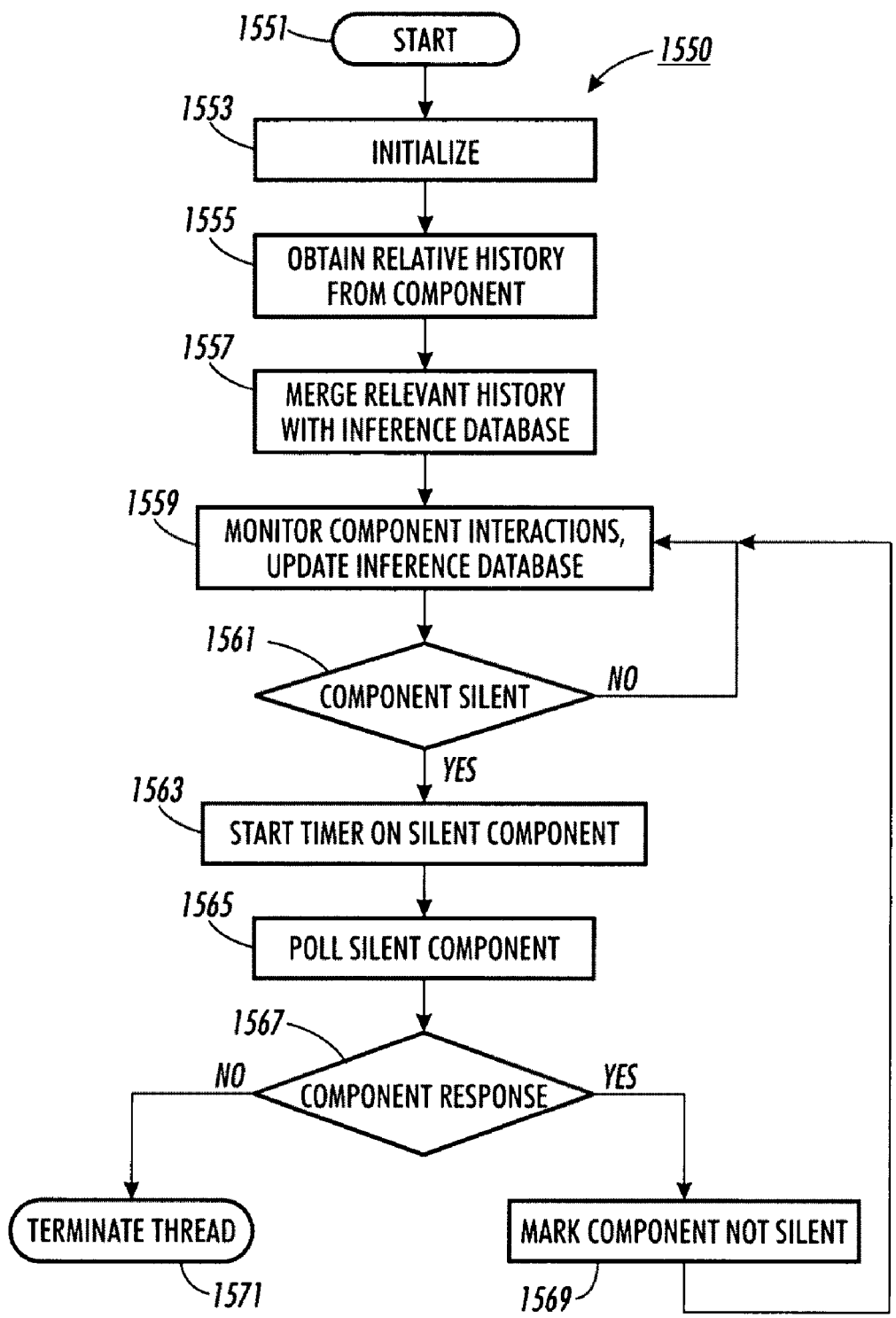
FIG. 18 illustrates a component monitor thread in accordance with an embodiment.

FIG. 18 illustrates a component monitor thread 1550 that can be invoked by the 'detect component' procedure 1517, that initiates at the 'start' terminal 1551 and continues to an 'initialization' procedure 1553 for any required initialization. Next, the component monitor thread 1550 continues to a 'gather history' procedure 1555 that obtains the historical context from the component/entity and determines what portion of the historical context is relevant to the current environment. The relevant historical context from the component/entity is merged with the inference database by a 'merge relevant history with inference database' procedure 1557. Next the component monitor thread 1550 continues to a 'monitor component interactions and update inference database' procedure 1559 that monitors the entity's/component's interactions with other entities/components and updates the inference database—thus making the current information available to be analyzed by the inference engine during the 'analyze per request' procedure 1531. The 'monitor component interactions and update inference database' procedure 1559 continually monitors the component's/entity's interactions and performs the update.

If the 'monitor component interactions and update inference database' procedure 1559 determines that the monitored entity/component has not interacted with any other component for some period of time, the component monitor thread 1550 marks the monitored entity/component as being silent. Periodically, the component monitor thread 1550 continues to a 'component silent' decision procedure 1561 that checks the entity/component to determine whether it is marked silent. If the entity/component is not marked silent, the component monitor thread 1550 returns to the 'monitor component interactions and update inference database' procedure 1559.

However, if at the 'component silent' decision procedure 1561 the monitored entity/component is marked as silent, it is possible that the monitored entity/component is no longer in the environment monitored by the context monitor. Then the component monitor thread 1550 continues to a 'start timer' procedure 1563 that initiates a time-out timer and then to a 'poll silent component' procedure 1565 that sends a message to the monitored entity/component to invoke a response. After expiration of the timer set by the 'start timer' procedure 1563, a 'component response' decision procedure 1567 determines whether the monitored entity/component responded. If the monitored entity/component responded, the component monitor thread 1550 continues to a 'mark component not silent' procedure 1569 that marks the monitored entity/component as being not silent. Then the component monitor thread 1550 continues to the 'monitor component interactions and update inference database' procedure 1559 to continue monitoring the monitored entity/component.

However, if at the 'component response' decision procedure 1567 the monitored entity/component has not responded, the component monitor thread 1550 continues to a 'terminate thread' procedure 1571 that releases resources and terminates the thread.

Another aspect of an embodiment is the use of contextual information to access and use security information. That is, security data can be maintained as a contextual property rather than requiring security information to be explicitly expressed through programmatic interfaces (as is done in the prior art). When components get data from, or request an operation on, each other, it is left up to the involved parties to decide on how (or if) to use the security information provided by the context. Thus, a uniform programmatic interface can be used for different security models and techniques.

When the requester component/entity would like to perform an operation on a service component, the requester component must pass security information (such as a certificate, password or any other proof of its identity) to the service component. This security information can be a contextual property ((just as "location" and "name" are contextual properties). Because all communication between components requires context to be passed as a parameter, the security information from the requester component can be provided to the service component (that can decide whether or not to use, and how to use the security data as specified by the optional context access policy 705 and the optional property access policy field 761). If the service component should decide to use the security information, it can send the requester component's/entity's certificate to an authentication agency for verification. Also, an entity can provide a guest certificate for subsequent redemption by the requester component/entity.

There are certain very commonly used contextual parameters (such as location, name, description, etc.) whose property key is "known" by other components. Similarly, components that are authenticated with a secure certificate have a context property whose key is well-known such as "certificate" or some other commonly known key. Because the security property is simply contextual information, the security property can be requested or not depending on the needs of the components, just as with any other context property. In addition, the certificate property can be provided with the rest of the component's properties.

By having the service component/entity determine whether to use the security information, the service component can easily make exceptions to the access policy in particular circumstances. For example, if an entity wanted to connect to a particular user's file system, the entity would ordinarily need to be fully authenticated by that file system component. However, if the user's file system were part of a small local Bluetooth network and the user agreed to share the user's files with someone the user could personally identify but who did not have access to certificate authentication components, the user can cause his component to override the security requirement to allow the entity access to the user's file system as the user can visually authenticate that entity.

The optional context access policy 705 and the optional property access policy field 761 can be used with the optional access control collection 707 and the optional access control collection 765 (for properties) respectively. These policies contain the rules that determine what kind of authentication is needed and under which circumstances authentication can be overridden.

In addition, this aspect of an embodiment also provides flexibility to modify the authentication strategy without having to modify the programmatic interfaces used by the components. In some cases, mutually trusted certificate granting/authenticating authorities are appropriate, while other components could use Public Key Cryptography where entities hold public keys for each other. Still other cases could require passwords that allow one component to 'log on' to another. Each of these cases could be handled by the same programmatic interface using the component's context.

One skilled in the art will understand that a procedure is a self-consistent sequence of computerized steps that lead to a desired result. These steps can be defined by one or more computer instructions. In addition, these steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executed by one or more computers. Such a procedure can also be implemented directly in circuitry that performs the steps. The steps make up a computer controlled method irrespective of whether the steps are performed by a computer or by dedicated circuitry. Further such a one will understand that a central processing unit coupled to a memory encompasses any apparatus that is capable of performing the described functions whether a computer processor unit is used, or whether sufficiently complex circuitry is used to perform the function. In addition, such a one will understand that computers are commonly used in everyday devices such as (for example, but without limitation, cell phones, remote controls, thermostats, automobiles, PDAs and etc.) as well as in stand-alone units such as a personal computer or a mainframe computer.

One skilled in the art would understand that the embodiments provide at least the following advantages:

An extensible context that allows arbitrary includes of arbitrary data.

A rich history context that enables a wide range of applications.

A history context that is accessible to other components.

The ability to use the history context to reconstruct a particular configuration of services, to mine for information, to improve sensemaking, and to assist a user in selecting and using services.

Accountability support because all operations can be logged so that the past system state and cause of state changes can be determined.

Chained operations that allow a user to know the pedigree of data. Stacked operations that allow one component to maintain a history of inter-component interactions.

Any component that has information relevant to the current context of an entity is permitted to share that information with the entity.

A uniform programmatic interface that supports different security models and techniques, thus simplifying implementation of security features.

Simplified user interaction with the component and/or environment that results from filtering and/or prioritizing the results of a component query using background contextual information of both the entity making the query and the components being queried.

The ability to filter out components that cannot be used by matching contextual requirements for components with contextual state for people.

The ability to prioritize components according to popularity based on usage history for components combined with usage history for people.

Providing a richer representation of context by attaching contextual information to entities that use their associated components.

The ability to evaluate the context of the current environment to optimize the relevant contextual parameters for the component.

Inference engines can use the historical context for sensemaking and to assist an entity in the use of the components within the environment.

Other modifications may occur to those skilled in the art subsequent to a review of the present application, and these modifications, including equivalents thereof, are intended to be included within the scope of the present invention. Further, the recited order of processing elements or sequences, or the use of numbers, letters, or other designations therefore, is not intended to limit the claimed processes to any order except as may be specified in the claims.

What is claimed is:

1. A method for accumulating a historical context of interactions between components, comprising:

maintaining a plurality of components that each have a component context and which comprise at least one of a requester component and at least one of a service component;

identifying an interaction comprising the requester component requesting an operation to be performed by the service component by sending the component context of the requester component to the service component;

recording the operation in the component context of the service component and associating the operation with a status of incomplete;

changing the incomplete status of the operation after at least one of the operation is performed and the operation is denied; and recording the component context of the requester component into the component context of the service component as contextual metadata.

2. The method according to claim 1, wherein said contextual metadata is accreted with historical metadata.

3. The method according to claim 1, wherein the contextual metadata is recorded by said service component.

4. The method according to claim 1, further comprising:
recording, by a context monitor, the identified interaction between the requester component and the service component.

5. The method according to claim 1, wherein said contextual metadata comprises one or more of a time, a location, a cause, and an identification of the requester component.

6. The method according to claim 1, further comprising:
authenticating that the requester component is authorized to cause the service component to perform the operation.

7. The method according to claim 6, further comprising:
authenticating that the requester component is authorized to cause the service component to perform the operation on a property of the service component.

8. The method according to claim 1, wherein the requester component context includes security information.

9. The method according to claim 8, further comprising:
authenticating the requester component using the security information.

10. The method according to claim 1, further comprising:
retrieving the recorded component context of the service component; and
developing a history of use of said service component.

11. The method according to claim 10, wherein retrieving said component context accesses said service component.

12. The method according to claim 1, further comprising:
retrieving the identified interaction between the requester component and the service component from a context monitor to develop a history of use for the service component.

13. The method according to claim 12, further comprising:
reconstructing a prior configuration for a service that used the service component and the requester component; and
establishing a similar configuration based on the prior configuration for the service.

14. The method according to claim 13, further comprising:
generating a selection set comprising at least one of a prior configuration and a similar configuration;
filtering the selection set; and
selecting, by the user, one or more of the at least one prior configuration and the similar configuration from the filtered selection set.

15. The method according to claim 14, further comprising:
reconstructing a prior configuration for a service that used the service component and the requester component; and
presenting the prior configuration for the service for selection by a user.

16. A system for accumulating a historical context of interactions between components, comprising:
a maintenance mechanism to maintain a plurality of components that each have a component context and which comprise at least one of a requester component and at least one of a service component;
an identification mechanism to identify an interaction comprising the requester component requesting an operation to be performed by the service component by sending the component context of the requester component to the service component;
a history mechanism to record the operation in the component context of the service component, to associate the operation with a status of incomplete, and to change the incomplete status of the operation after at least one of the operation is performed and the operation is denied; and
a recording mechanism to record the component context of the requester component into the component context of the service component as contextual metadata.

17. The system according to claim 16, wherein the recording mechanism is located within the service component.

18. The system according to claim 16, wherein said contextual metadata is accreted with historical metadata.

19. The system according to claim 16, wherein said contextual metadata comprises one or more of a time, a location, a cause, and an identification of said requester component.

20. The system according to claim 16, further comprising:
a history retrieval mechanism to retrieve the recorded component context of the service component and to develop a history of use of said service component.

21. The system according to claim 20, further comprising:
a configuration reconstruction mechanism to reconstruct a prior configuration for a service that used the service component and the requester component; and
a configuration establishment mechanism to establish a similar configuration based on the prior configuration for the service.

22. The system according to claim 21, further comprising:
a generation mechanism to generate a selection set comprising at least one of a prior configuration and a similar configuration;
a filter mechanism to filter the selection set; and
a selection mechanism to allow the user to select one or more of the at least one prior configuration and the similar configuration from said filtered selection set.

23. An apparatus for accumulating a historical context of interactions between components, comprising:
means for maintaining a plurality of components that each have a component context and which comprise at least one of a requester component and at least one of a service component;
means for identifying an interaction comprising the requester component requesting an operation to be performed by the service component by sending the component context of the requester component to the service component;
means for recording the operation in the component context of the service component, means for associating the operation with a status of incomplete, and further means for changing the incomplete status of the operation after at least one of the operation is performed and the operation is denied; and
means for recording the component context of the requester component into the component context of the service component as contextual metadata.

* * * * *